(12) United States Patent
Kanteti et al.

(10) Patent No.: US 9,785,518 B2
(45) Date of Patent: Oct. 10, 2017

(54) MULTI-THREADED TRANSACTION LOG FOR PRIMARY AND RESTORE/INTELLIGENCE

(71) Applicant: HyTrust, Inc., Mountain View, CA (US)

(72) Inventors: Kumar Kanteti, South Grafton, MA (US); Paula Long, Amherst, NH (US); Kannan Sasi, Pelham, NH (US); Gregory James McHale, Brookline, NH (US)

(73) Assignee: HYTRUST, INC., Mountain View, CA (US)

( * ) Notice: Subject to any disclaimer, the term of this patent is extended or adjusted under 35 U.S.C. 154(b) by 56 days.

(21) Appl. No.: 14/828,905

(22) Filed: Aug. 18, 2015

(65) Prior Publication Data

US 2016/0048351 A1 Feb. 18, 2016

Related U.S. Application Data

(60) Provisional application No. 62/038,498, filed on Aug. 18, 2014.

(51) Int. Cl.
*G06F 11/14* (2006.01)
*G06F 9/455* (2006.01)
(Continued)

(52) U.S. Cl.
CPC ...... *G06F 11/1471* (2013.01); *G06F 9/45558* (2013.01); *G06F 11/1464* (2013.01);
(Continued)

(58) Field of Classification Search
CPC ............ G06F 11/1451; G06F 11/1464; G06F 11/1471; G06F 3/0619; G06F 3/067; G06F 3/065; G06F 17/30212; G06F 17/30233
See application file for complete search history.

(56) References Cited

U.S. PATENT DOCUMENTS 6,606,694 B2   8/2003  Carteau
7,251,708 B1*  7/2007  Justiss ................ G06F 11/1448
                                                707/999.007
(Continued)

FOREIGN PATENT DOCUMENTS

EP    2 595 060 A1      5/2013
WO    WO 2013/001332 A1  1/2013

OTHER PUBLICATIONS

"Understanding Indirect Blocks in Unix File Systems" posted by Hal Pomeranz on SANS Digital Forensics and Incident Response Blog, Dec. 24, 2008, 6 pages.
(Continued)

*Primary Examiner* — Nadeem Iqbal
(74) *Attorney, Agent, or Firm* — Ascenda Law Group, PC

(57) ABSTRACT

A unified system provides primary storage and in-line analytics-based data protection. Additional data intelligence and analytics gathered on protected data and prior analytics are stored in discovery points. The disclosed system implements multi-threaded log writes across primary and restore nodes with write gathering across file systems; nested directories such as may be used for storing virtual machine files, where every subdirectory has an associated file system for snapshot purposes; and cloning objects on demand with background metadata and data migration.

12 Claims, 20 Drawing Sheets

(51) Int. Cl.
G06F 17/30 (2006.01)
G06F 11/20 (2006.01)
G06F 3/06 (2006.01)

(52) U.S. Cl.
CPC ...... *G06F 11/2058* (2013.01); *G06F 11/2082* (2013.01); *G06F 17/30212* (2013.01); *G06F 17/30233* (2013.01); *G06F 3/065* (2013.01); *G06F 3/067* (2013.01); *G06F 3/0619* (2013.01); *G06F 2009/45591* (2013.01); *G06F 2201/85* (2013.01)

(56) References Cited

U.S. PATENT DOCUMENTS

| | | | |
|---|---|---|---|
| 7,353,311 B2* | 4/2008 | Murdock | G06F 13/4022 |
| | | | 710/244 |
| 7,567,991 B2 | 7/2009 | Armangau et al. | |
| 7,617,217 B1 | 11/2009 | Chen et al. | |
| 7,685,385 B1 | 3/2010 | Choudhary et al. | |
| 7,913,046 B2 | 3/2011 | Kamay et al. | |
| 8,037,264 B2 | 10/2011 | Koning et al. | |
| 8,046,548 B1 | 10/2011 | Chatterjee et al. | |
| 8,392,477 B2 | 3/2013 | Brown et al. | |
| 8,806,274 B1 | 8/2014 | Chatterjee et al. | |
| 8,849,764 B1* | 9/2014 | Long | G06F 11/1451 |
| | | | 707/646 |
| 8,935,502 B2* | 1/2015 | Bonzini | G06F 12/16 |
| | | | 711/165 |
| 9,116,847 B2* | 8/2015 | Liu | G06F 3/0482 |
| 9,213,706 B2* | 12/2015 | Long | G06F 17/30289 |
| 9,262,281 B2* | 2/2016 | Long | G06F 11/1451 |
| 2005/0022051 A1* | 1/2005 | Zane | G06F 11/2058 |
| | | | 714/6.12 |
| 2005/0273486 A1 | 12/2005 | Keith, Jr. | |
| 2006/0123062 A1 | 6/2006 | Bobbitt et al. | |
| 2011/0040812 A1 | 2/2011 | Phillips | |
| 2014/0208083 A1 | 7/2014 | Burnett | |
| 2014/0372378 A1* | 12/2014 | Long | G06F 11/1451 |
| | | | 707/646 |
| 2014/0372384 A1 | 12/2014 | Long et al. | |
| 2016/0048428 A1* | 2/2016 | Kanteti | G06F 11/1451 |
| | | | 707/646 |

OTHER PUBLICATIONS

Log-structured File Systems, Chapter 43, Operating Systems, Version 0.90, Arpaci-Dusseau, 2014, 15 pages.

Log-structured Memory for DRAM-based Storage, Rumble et al., Proceedings of the 12$^{th}$ USENIX Conference on File and Storage Technologies (FAST '14), Feb. 17-20, 2014, Santa Clara, CA 16 pages.

International Search Report and Written Opinion dated Mar. 3, 2016 for International Application No. PCT/US2015/045659 filed Aug. 18, 2015 by DataGravity, Inc., 20 pages.

* cited by examiner

MULTI-THREADED TRANSACTION LOG FOR PRIMARY AND RESTORE/INTELLIGENCE

CROSS-REFERENCE TO RELATED APPLICATIONS

This patent application claims priority to U.S. Provisional Patent Application Ser. No. 62/038,498 filed Aug. 18, 2014. This patent application also generally relates to U.S. utility patent application Ser. No. 14/017,754 filed Sep. 4, 2013, now issued as U.S. Pat. No. 8,849,764, titled "SYSTEM AND METHOD OF DATA INTELLIGENT STORAGE", U.S. utility patent application Ser. No. 14/157,974 filed Jan. 14, 2014, now issued as U.S. Pat. No. 9,213,706, entitled "LIVE RESTORE FOR DATA INTELLIGENT STORAGE SYSTEM" and U.S. utility patent application Ser. No. 14/203,871 filed Mar. 11, 2014, now issued as U.S. Pat. No. 9,262,281 entitled "CONSOLIDATING ANALYTICS METADATA". The entire contents of each of the above-referenced patent applications are hereby incorporated by reference.

BACKGROUND

Discussed herein are techniques applicable for a High Availability (HA) storage system that collects analytics while also protecting data on separate physical media. The analytics may enable other functions such as data intelligence. In such a system as described in the referenced patent applications, primary data is read from and written to a primary storage pool. As the data is written to the primary pool it is automatically mirrored and also tracked for data protection to a recovery pool. The mirror can also be used for intelligence including analytics stored as discovery points.

BRIEF SUMMARY

More particularly, the techniques disclosed herein relate to a system that merges primary data storage, data protection, and intelligence into a single unified system. The unified system provides primary and restore data, analytics, and analytics-based data protection without requiring separate solutions for each aspect. Intelligence is provided through inline data analytics, with additional data intelligence and analytics gathered on protected data and prior analytics, and stored in discovery points, all without impacting performance of primary storage.

More particularly, the disclosed system implements:
  multi-threaded log writes across primary and restore nodes;
  nested virtual machine directories, where subdirectories are associated with a virtual structure that corresponds to a file system for snapshot purposes;
  file system clone available on demand with background metadata and data migration; and/or
  write gathering across file systems/nodes.

In one embodiment, that multi-threaded log writes are implemented at a protection and analytics (PART) node. The PART node receives access requests from multiple concurrently executing threads, and assigns a transaction identifier (ID) to the access requests. The PART then collects the access requests in a random access, multithreaded log before sending them to both a primary and a restore storage system. Subsequently, the PART forwards the access requests from the PART node to the primary node and restore node.

The PART may further optionally determine when a number of access requests in the random access, multi-threaded log reaches a predetermined number. At that time, the PART issues a synchronization command to the primary and restore nodes which causes data to be flushed from respective temporary caches to a persistent file system in each of the primary and restore. Once data is confirmed as having been flushed in both the primary and restore nodes, the PART may then release entries in the random access, multithreaded log.

Another aspect is particularly useful where the system is to support snapshot and other actions applied to virtual machine definition files arranged in subdirectories. Here the PART maintains a set of file system level objects, one for each subdirectory in a directory tree created by an application, such as a hypervisor. The PART intercepts a make directory request from the application to store a new a file system level object for each subdirectory in the tree. The file system level object contains access information for the corresponding subdirectory, such that multiple make directory requests result in storing a corresponding multiple number of file system level objects as a virtual file system.

Subsequently received access requests for applying a file system action a file system object located with a subdirectory are then serviced by the primary and restore nodes using only the virtual file system level object information and not the subdirectory directly. This ensures that the virtual file system objects remain transparent to the application.

In this arrangement, a property may be associated with two or more virtual file system objects to indicate that an access request applies to two or more subdirectories as a consistency group.

In another embodiment, the data-intelligent storage system intercepts a request to clone a data object. A clone object is first thin provisioned and opened for access. Data is copied to the clone object only upon the first to occur of either (a) a subsequent access request for the clone object, or (b) as part of a background restore process. Thin provisioning may involve creating a bitmap data object containing a bit for each one of a plurality data chunks in the data object.

Bits may be set in the bitmap corresponding to data chunks referred to in the subsequent access request for the clone. In such an instance, the bitmap is updated as data chunks are copied to the clone object.

A separate process for handling temporary clone objects uses the bitmaps to determine when to access the original object, the clone, or a snapshot.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF A PREFERRED EMBODIMENT

Terminology

Figure 1:
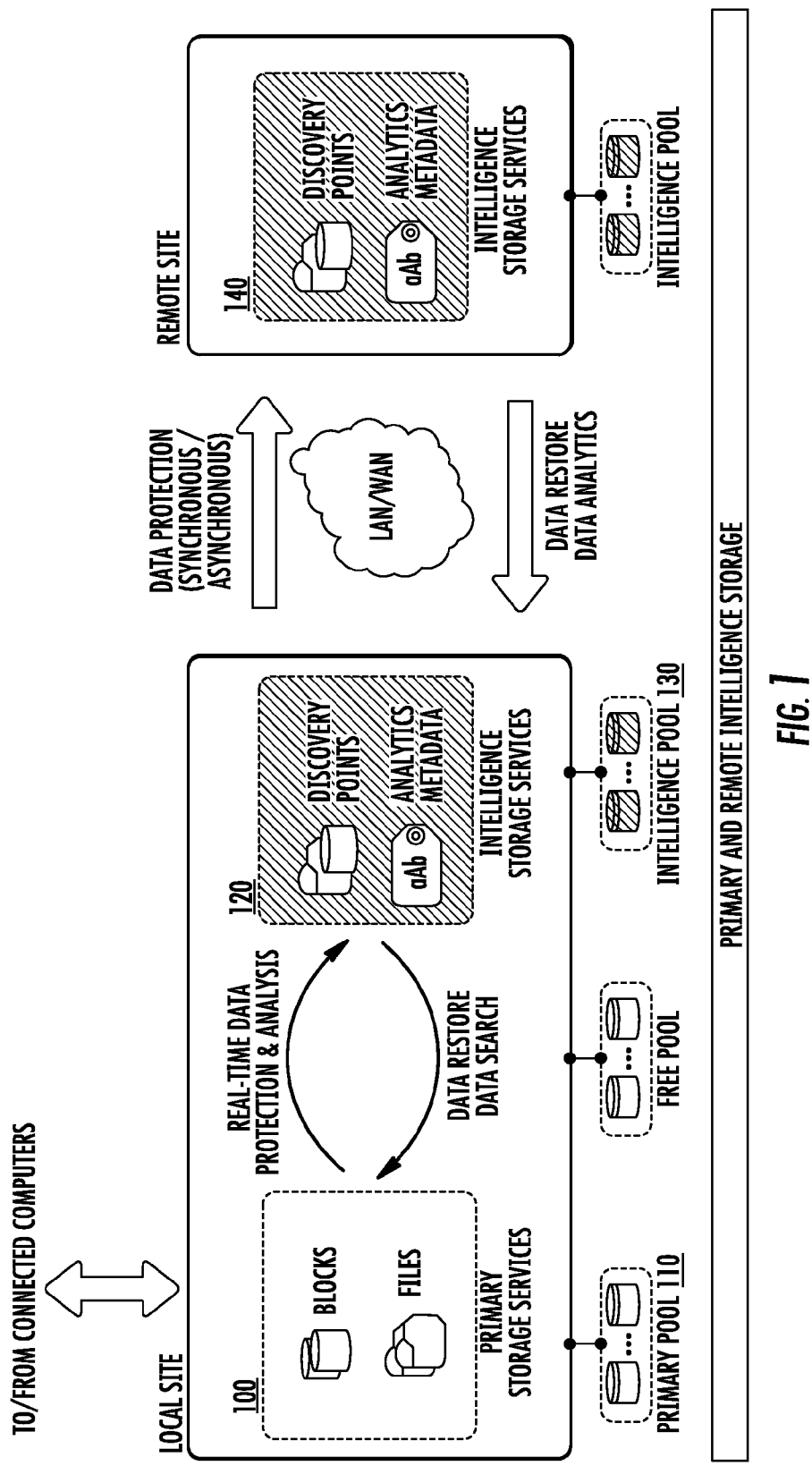
FIG. 1 is a diagram showing interaction between a Primary Node, Intelligence Node, and Remote Intelligence Node, and connected storage pools.

The terminology and definitions of the prior art are not necessarily consistent with the terminology and definitions used herein. Where there is a conflict, the following definitions apply.

Primary Storage: networked storage accessible to multiple computers/workstations. The storage can be accessed via any networked device, either as files or blocks. Unless explicitly stated, "primary storage" refers to both blocks and files.

Intelligence Storage: secondary storage containing gathered intelligence, discovery points, and a redundant real-time copy of files and block data contained in Primary Storage.

Primary Node: includes access protocols to communicate with an Intelligence Node, Remote Sites, and Expansion Nodes; access protocols layer (for example, NFS, SMB, iSCSI); protection and analytics in real-time ("PART") layer; file and block storage layer (file system, block volume); and connection to storage devices (RAID, DISK, etc.). A Primary Node appears to system users as Primary Storage, and provides an interface and controls to act as the access to Intelligence Storage.

Intelligence Node: includes access protocols to communicate with a Primary Node, Remote Sites, and Expansion Nodes; data intelligence storage layer (intelligent data services & rules processing); file and block storage layer (file system, block volume); and connection to storage devices (RAID, long-term storage). In the preferred embodiment, intelligence node data is accessed by users through a Primary Node, but in alternate embodiments Intelligence Nodes may be directly accessed by users.

Discovery Point: A discovery point, created from a mirrored (high availability) copy of primary data, contains data analytics for accessed and changed primary data since a prior discovery point. A discovery point may contain the changed data, providing for a virtually full but physically sparse copy of the primary data captured at a user-specified point in time or dynamically based on change rate or other analytics. While primary data does not change within a discovery point after the discovery point was created, analytics metadata stored in a discovery point can be expanded as deeper levels of user data analysis are performed and more analytics are gathered. Tracked primary data changes can be retained for the life of the discovery point or can be removed at scheduled or dynamic intervals, such as after deep data analysis is complete and desired analytics metadata is obtained. Removing primary data allows for more efficient space utilization, while retaining primary data enables point-in-time recovery of that version of data.

Change Catalog: an ordered set of real-time access and change information related to a data object, tracked at a discovery point granularity. A change catalog tracks who, how, when, and where aspects of a data object being accessed and/or modified. There is one change catalog for every discovery point.

Remote Site: one or more off-site nodes in communication with local site primary or intelligence nodes.

Pool: the collection of data storage connected to a node.

Object: a file, directory, share, volume, region within a volume, or an embedded object. Objects can be complex, containing other embedded objects. For example, a file can be a container containing other files, or a volume can have a file system on top of it which in turn contains files. The system is capable of recognizing complex objects and tracking changes at finer embedded object granularity.

Selective Restore: an automatic (policy based) or manual (customer initiated) restore at an object level.

Site Restore: a manually initiated process to recreate primary or intelligence pool content using a previously protected version of the data being restored.

Container: objects which may have other embedded objects, such as a file, directory, file system, or volume.

Expansion Nodes: appliance having a processor, memory (RAM), network connectivity, and storage devices, and connected to one or more primary or intelligence nodes scaling the processing power and/or storage for connected nodes.

System Overview

In the following detailed description, reference is made to the accompanying drawings which form a part hereof, and in which are shown, by way of illustration, specific embodiments in which the invention may be practiced. It is to be understood that other embodiments may be used, and structural changes may be made without departing from the scope of the present invention as defined by the claims.

The disclosed high availability (HA) storage system provides primary storage, analytics, and live restore functions. Live restore is a technique used to optimize data restoration. It can be used to recover user data in case of a failure or to recover previous versions of the user data. The system provides primary storage access as block and/or file level storage while avoiding single points of failure. The system collects analytics in real-time while also protecting data in real-time on separate physical media, and includes options for off-site data protection. The system implements deep analytics enabling restore, storage, and data intelligence, and protects both customer data and associated analytics. The system provides traditional file based and custom API methods for extracting analytics metadata. The system employs Live Restore techniques at a file and at a block level to recover in case of a failure or to recover a previous version of user data. This provides for near-instantaneous restore at the object level, and significantly reduces wait-before-access time in case of primary or intelligence node complete failure (e.g., a full site restore). A file or block level Live Restore uses previously gathered analytics to prioritize data to be restored, while allowing user I/O access to the data during restoration.

Referring to FIG. 1, Primary Node 100 of the system connects within a network to provide block and/or file level storage access to connected computing devices (not shown), real-time data protection, and real-time analytics of primary data. Primary data is read from and written to primary storage pool 110. The data can be written or read as files or blocks depending on the access protocol being used. As the data is written it is automatically mirrored and tracked for data protection as part of a HA process for the primary node. The mirrored cache of the data is created for Intelligence Node 120. The Intelligence Node enables data protection, analytics, and recovery. The Intelligence Node stores a real-time copy of primary data, analytics and discovery points within intelligence pool 130. Discovery points are automatically or manually created at any point by the Intelligence Node, and based on fine grained change data enabling action to be taken immediately with no need to copy the underlying primary data or do any post processing to determine what has changed since any prior discovery point.

In a preferred embodiment, each Node is capable as acting as either a Primary Node, an Intelligence Node, or both. For reliability and performance reasons, separate Primary and Intelligence Nodes are desirable. In case of failure of either node, the other may take over operation of both. Implementation without dual-capability (that is, operating solely a Primary Node and solely an Intelligence Node) is possible but loss of service (to either primary or intelligence storage) would occur on failure of such a node. In a preferred embodiment, each one of the Nodes has a processor and local memory for storing and executing Node software, a connection to physical storage media, and one or more network connections including at least a dedicated high bandwidth and low latency communication path to other Nodes.

Figure 2:
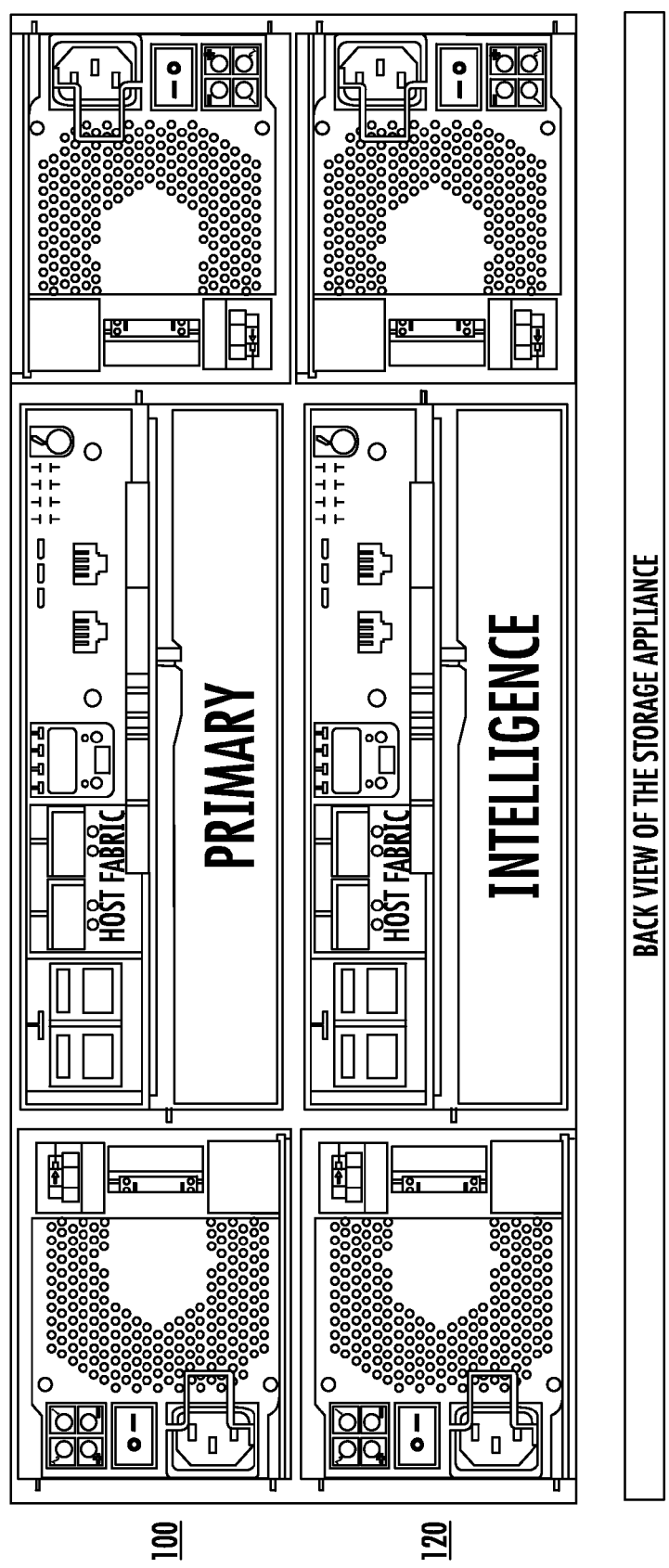
FIG. 2 is a view of an appliance device containing Primary and Intelligence Nodes.

In a preferred embodiment, the Primary Node and Intelligence Node are physically housed within a single device, creating a user impression of a single appliance. FIG. 2 shows one such example, with Primary Node 100 and Intelligence Node 120 housed together to appear as a single physical appliance. Implementation may be with any number of disks, for example such as a four rack units (4U) housing containing up to twenty-four hard drives, with separate physical storage devices connected to the system. Internally each node is completely separated from the other with the exception of a backplane, with each node having a dedicated (not shared) power supply, processor, memory, network connection, operating media and optionally non-volatile memory. Separation enables continued operation, for example the Intelligence Node may continue operating should the Primary Node fail, and vice versa, but shared resource implementation is also possible.

Primary Node

Figure 3:
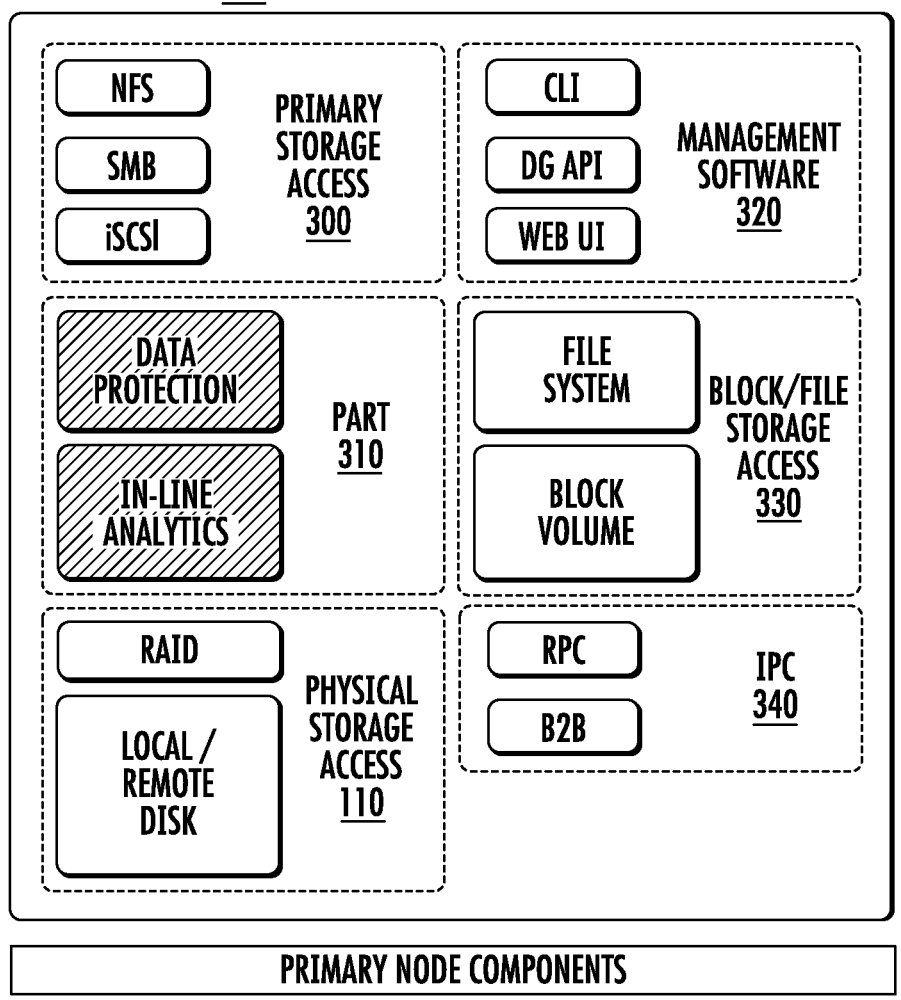
FIG. 3 is a diagram showing the components of a Primary Node.

Also referring to FIG. 3, a node actively operating as Primary Node 100 operates storage protocol server software 300, for example Common Internet File System (CIFS), Network File System (NFS), Server Message Block (SMB), or Internet Small Computer System Interface (iSCSI), so the Primary Node will appear as primary storage to network-connected computer devices. The storage protocol server software also communicates with a protection and analytics in real-time process (PART) 310 which intercepts and takes action on every data access.

The PART 310 performs three main roles after intercepting any data access request: mirroring primary data for HA, gathering in-line data analytics on primary data, and storing primary data. The examples explained herein are directed to a file access perspective, but the PART can similarly process block level accesses. When performing block access to a volume, the PART can identify embedded objects and perform the same analysis that is applied to file-level accesses. Intercepted access requests include read, modify (write data or alter attributes, such as renaming, moving, or changing permissions), create, and delete. The PART tracks and mirrors the request (and data) to the Intelligence Node. Communication with the Intelligence Node is through synchronous or asynchronous inter-process communication (IPC) 340 depending on configuration. IPC may including any suitable protocols or connections, such as Remote Procedure Call (RPC) or a Board-to-Board (B2B) high performance, low latency communication path that may be hardware specific. Any data included with a data access request, such as included in write operations, is also mirrored to the Intelligence Node as part of HA system operation. This mirroring establishes data protection through real-time redundancy of primary storage. Additionally, the PART executes in-line analysis of primary data, gathering real-time analytics. The PART sends gathered real-time analytics to the Intelligence Node, where the analytics are added to a change catalog maintained by the Intelligence Node. In addition to analytics, the PART directs the request to an actual file system, for example Fourth Extended File System (EXT4) or Z File System (ZFS), or block volume for file or block storage access 330 to physical storage devices.

The storage access function 330 (be it file system level or block level) performs the access request on storage media, and returns the result to the PART for return to the requesting system. In a preferred embodiment, the storage media includes disks attached to the system, but other storage media solutions are possible.

In a preferred embodiment, the Primary Node also includes the software necessary to operate as an Intelligence Node in case of Intelligence Node failure.

In a preferred embodiment, the Primary Node also operates management software. Preferably accessed through a browser interface (although any user interface provision method may be used), the management software provides system administrators access to configure and manage system users and access discovery points for the restore process.

Intelligence Node

Figure 4:
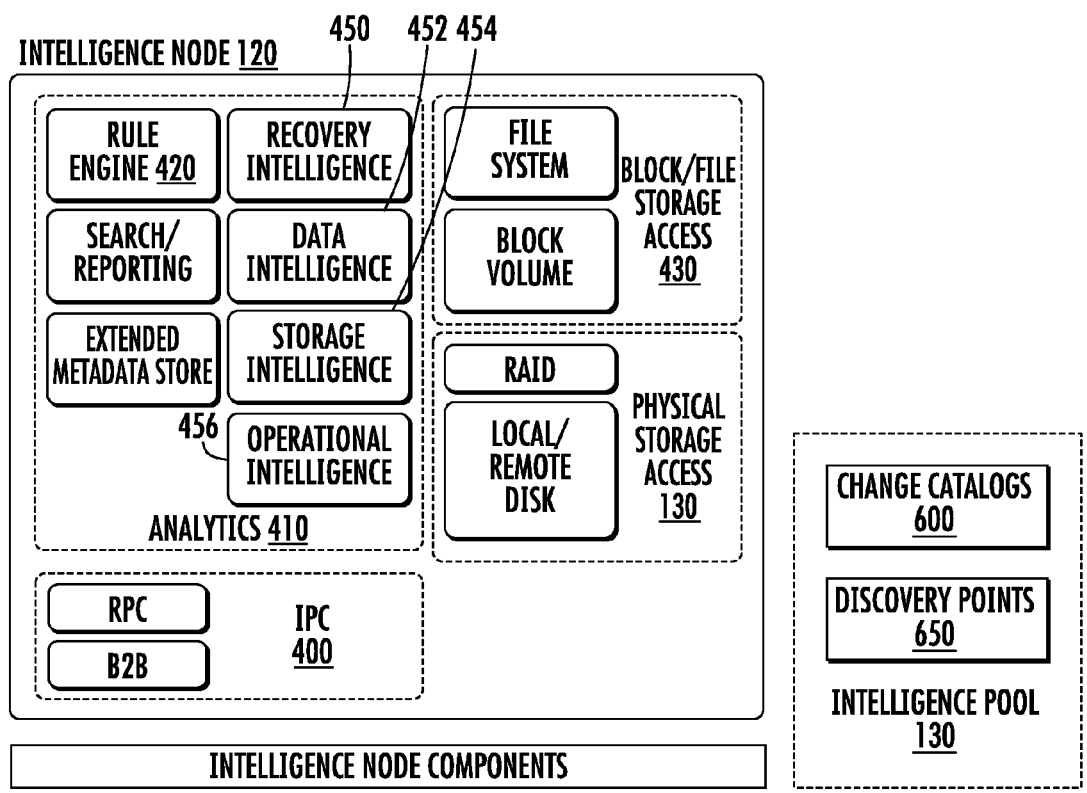
FIG. 4 is a diagram showing the components of an Intelligence Node.

Referring also to FIG. 4, a node actively operating as Intelligence Node 120 operates Inter Process Communication (IPC) communication software 400 capable of communicating with the Primary Node. The communication software includes an API to receive real time analytics (change catalog entries) from the Primary Node, data change and access requests (read, modify, create, delete) from the Primary Node, data protection and intelligence control commands, and data restore commands. Data protection and intelligence control commands include commands for creating discovery points, setting up management rules for managing discovery points (including deletion), and searching and restoring content that has been backed up. Data restore commands include commands for accessing previously backed up data.

Data change requests that are received at the Intelligence Node are applied to that node's copy of current data, thereby maintaining a real-time mirror of primary storage. This implements real-time data protection for the current data.

For data analytics and data recovery purposes, the Intelligence Node maintains a change catalog 600 containing real-time analytics gathered from accessed and changed data since the last discovery point 650. A discovery point is also created by associating and storing a change catalog together with reference to the mirrored copy of changed primary data since the last discovery point as maintained in the intelligence pool. A more detailed discussion of the change catalogs and discovery points is provided below.

The Intelligence Node implements file or block-level access 430 to its own pool 130 of physical storage. This intelligence storage pool retains the real-time copy of primary data and discovery points. The stored intelligence data within discovery points includes in-line analytics (change catalog) as received from the Primary Node and additional analytics 410 executed by the Intelligence Node.

The real-time copy of primary data also enables distributed response processing between the Primary and Intelligence Nodes. For example, load balancing between the Primary and Intelligence Nodes may enable greater scalability. As both have real-time copies of primary data, read requests may be balanced between the nodes, or alternatively directed to both nodes with the fastest-to-respond used for the response. The Primary Node may act as a controller for such distributed processing, or a separate controller may be used.

There is no requirement that the Primary 110 and Intelligence Data 130 reside on the same appliance, they can be distributed to multiple discrete appliances deploying all the same techniques with the exception that the communication method is performed over a network transport instead of using the HA mechanisms within an array.

Analytics

Intelligence is at the core of the system. There are four types of intelligence functions in the system: Data, Operational, Storage, and Recovery. All four use the same processing engine and common analytics metadata to provide analysis both at fixed points and as gathered over time. Data Intelligence 452 allows for intelligent user content management. Operational Intelligence 456 analyzes the behavior of the system and application logs stored on the system to provide insight into applications and security of the system. Storage Intelligence 454 allows for intelligent storage system resource management, including automatic storage allocation and reallocation including dynamically growing and shrinking storage pools. Recovery Intelligence 450 allows for intelligent data protection and data restore. All types of intelligence may be used for, or enable operation in conjunction with, different types of analytics, such as, but not limited to, collaboration, trending, e-discovery, audits, scoring, and similarity.

Analytics begin at the Primary Node, which tracks data access and data modifications, system behavior, change rates, and other real-time analytics. It provides this real-time analytics information to the Intelligence Node. Intelligence gathering determines time and owner relationships with the data for collaboration and contextual information about the data. The gathered intelligence is used for later search and reporting, and is tracked in change catalogs associated with the data.

Figure 5:
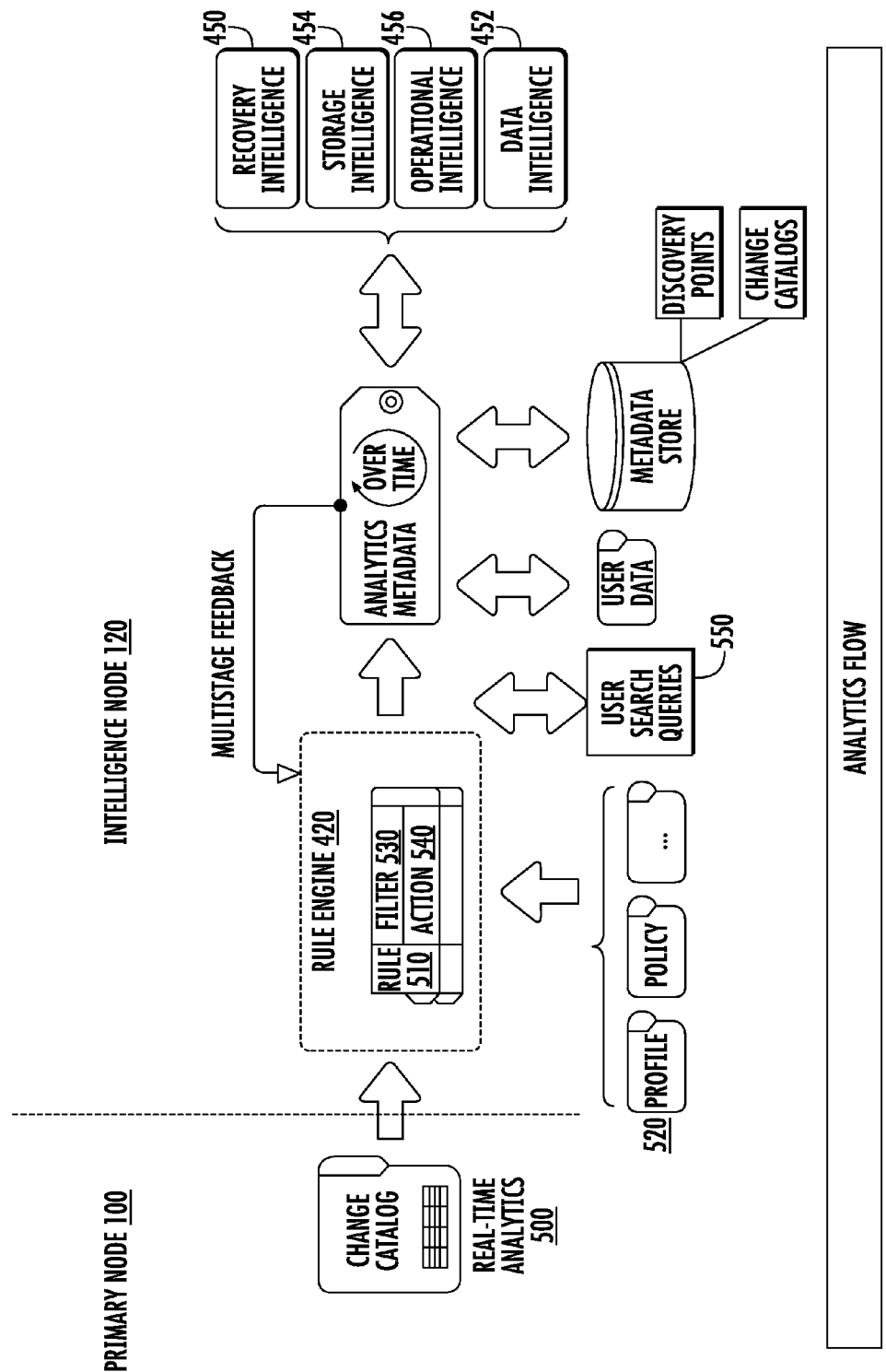
FIG. 5 is a diagram showing the analytics flow process.

Referring now to FIG. 5 and to FIG. 6A, change catalogs 600 are created as part of in-line real-time analytics 500 performed by the Primary Node 100, but change catalogs 600 are then also further expanded by the Intelligence Node 120 performing further data processing, and create the foundation for later search. The change catalog data is initially created in real-time at the Primary Node (such as via PART 310) and includes extended information about the specific data access, for example, allowing complete tracking of who/how/when/where accessed, created, modified, or deleted a file or other data object. Traditional file metadata includes only an owner, group, path, access rights, file size, and last modified timestamp. This provides some, but not complete, information about a file. For example, it does not identify who modified the file, how many modifications have occurred, or any information about file accesses (such as viewing or reading a file) which do not modify the file. The PART, operated by the Primary Node, intercepts every file access event. Thus the Primary Node has the ability to track extended metadata about a file—including identification of every modification and every access, even those which do not modify the file, by timestamp, user, and type of access.

Figure 6A:
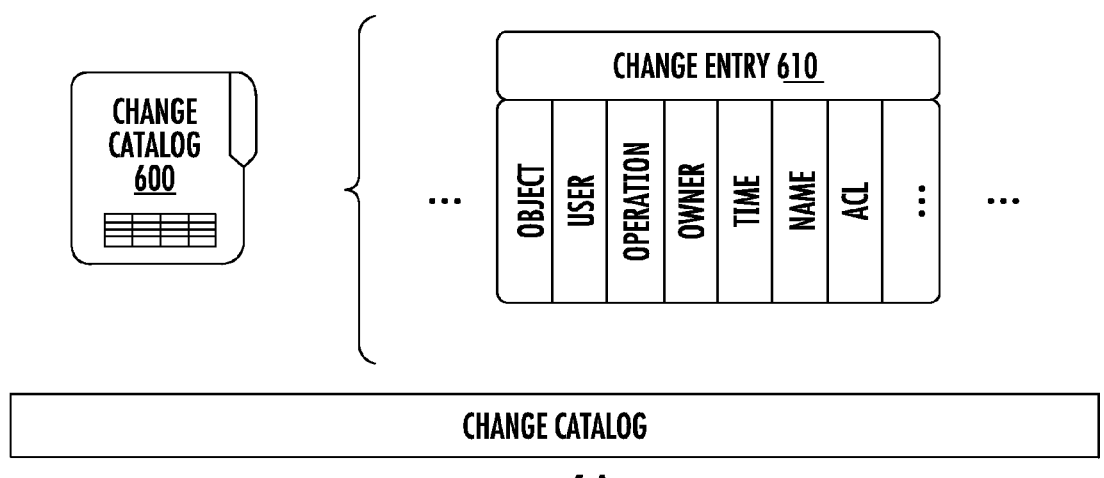
FIG. 6A is a diagram showing the structure of a change catalog.

Referring also to FIG. 6A, this extended metadata is stored as a change catalog entry 610 that identifies the object being accessed, the actor (user performing an operation), and the operation being performed. Additional information which may be in a change catalog entry includes, but is not limited to, object name, owner, access control lists, and time of operation. The change catalog 600 contains this extended metadata information, and serves as the foundation of further analytics, such as performed later by the Intelligence Node. The change catalog entry may also include security information, such as permission rights for access, associated with the object. An administrator may configure the degree of tracking, or even enable/disable tracking on a file location, user, group-specific, or other basis, and the Primary Node is capable of incorporating all details of every file access into the change catalog entries. These change catalog entries of enhanced metadata are gathered by the Primary Node and transmitted to the Intelligence Node for storing and expanding with further analytics.

Figure 6B:
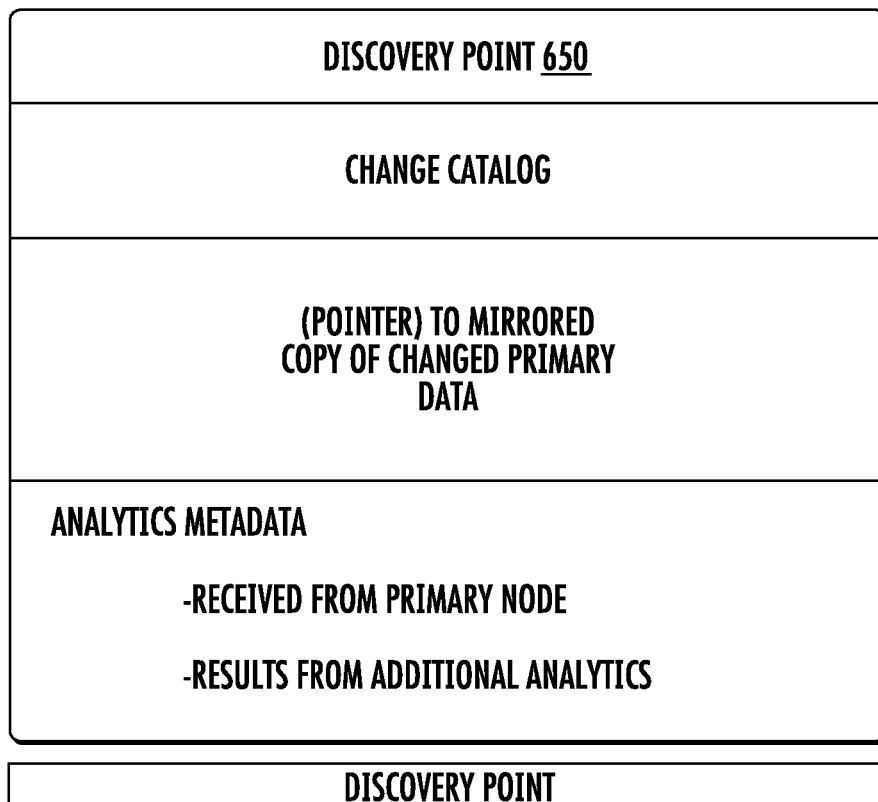
FIG. 6B shows a discovery point.

With reference now also to FIG. 6B, the change catalog metadata tracks incremental changes which are also linked to a discovery point 650. Every time a new discovery point is created the current change catalog is closed off and stored within the discovery point. When data is retained in the discovery point, the system may be configured to retain a copy of the discovery point analytics metadata at the Intelligence Node even if that discovery point is migrated off the Intelligence Node, enabling more efficient query processing.

A discovery point 650 is created by associating and storing a change catalog together with the mirrored copy of changed primary data since the last discovery point in the intelligence pool. After a discovery point creation, a new change catalog 600 is created allowing gathering of new real-time analytics on primary data. Change catalogs and discovery points are preferably maintained per volume or file system in primary storage, but may also span multiple volumes or file systems. Discovery points allow deeper analytics on a point in time version of primary data, and can also be used to recover a prior version of primary data. A discovery point contains data analytics for accessed and changed data since a prior discovery point. When created, a discovery point also contains a virtually full but physically sparse copy of primary data at the time of creation of that discovery point. The system uses data visible within discovery points to perform deeper data processing, creating more analytics metadata. The analysis is done on accessed and changed data since a previous discovery point, using the real-time analytics reflected in the change catalog. These newly gathered deeper analytics are also stored within the discovery point. Primary data may be retained for the life of the discovery point, or may be removed earlier, such as after the deep data analysis is complete and desired analytics metadata obtained. Removing the primary data allows for more efficient space utilization, while retaining the primary data enables recovery of primary data at the point in time of the creation of the discovery point. From one discovery point until the creation of a next discovery point, file changes, deletions, renames, creations and such are tracked as cumulative modifications to from the prior discovery point, so that only incremental changes are maintained. This creates a version of the data at each discovery point. While the data is retained in a discovery point, the system is able to restore data at the discovery point granularity. As change catalogs are stored with each discovery point, information about change history between discovery points may be available through analysis of the change catalog. To restore a data object at a particular point in time, a discovery point is used. For long-term storage, discovery points may be moved to long-term media such as tape or off-site storage as configured through the management software.

Discovery points can be deleted manually through a delete discovery point command, or automatically based on time or analysis in order to save storage space or for off-site migration. Deletion of discovery points is complicated by management of analytics metadata. The analytics metadata stored within a discovery point contains information about data changed within a period of time. If the stored analytics are deleted they can be lost. To prevent this, the time period for analytics associated with one or more other discovery points can be adjusted, and relevant portions of analytics metadata from a discovery point being deleted extracted and merged with other analytics already stored within the other discovery points.

Returning attention now to FIG. 5, at the Intelligence Node, an adaptive parallel processing engine, or Rule Engine 420, operates on the change catalog 600 to derive these more complex analytics, including tracking changes and use over time. The Rule Engine applies rules 510 to analyze content on the underlying primary data, enabling deeper analytics on stored data. As an example, a second level dictionary can provide sentiment attributes to an already indexed document. Regular expression processing may be applied to see if a document contains information such as social security or credit card numbers. Each rule may have a filter 530 to match content, and an action 540 to take based on results. Rules can be nested, and used to answer user-specific questions. Another example may be to apply locations where keywords appear, for example to search objects for a set of keywords such as "mold" or "water damage," and in all matches to search the objects for address or zip code information. Rules are configurable by administrators or system users, allowing dynamic rule creation and combination based on different applicable policies 520. Rules can be combined in multiple ways to discover more complex information. Rules may also be configured for actions based on results. For example, notifications may be set to trigger based on detected access or content, and different retention policies may be applied based on content or access patterns or other tracked metadata. Other actions may include, but are not limited to, data retention, quarantine, data extraction, deletion, and data distribution. Results of applied rules may be indexed or tracked for future analysis.

As applied rules 510 identify results, such results may be indexed or tracked for other analytical use. This additional metadata may be added to the change catalogs for the relevant files or objects. The metadata may also be tracked as custom tags added to objects. Tags may be stored as extended attributes of files, or metadata tracked in a separate analytics index such as data in a directory or volume hidden from normal end user view, or in other data stores for analytics. Rules, and therefore analytics, may be applied both to data tracked and to the metadata generated by analytics. This enables analytics of both content and gathered intelligence, allowing point-in-time and over-time analysis. The rules results and actions may serve as feedback from one or more rules to one or more other rules (or even self-feedback to the same rule), enabling multi-stage analysis and workflow processing.

Recovery Intelligence 450

Recovery Intelligence is the set of analytics implemented by Intelligence Node 120 around data protection. The purpose is to protect data and associated analytics. When data reaches the Intelligence Node a mirrored copy is stored in the intelligence pool, creating redundancy with primary storage, and these changes are tracked for use in discovery point creation. Primary data, discovery points, and intelligence data are preferably separated on actual physical media at the spindle or disk pool level, such that a failure of a single individual physical device is always recoverable. As discovery points are created based on change catalogs tracked at the Intelligence Node, they can be created at any time without any impact on the performance of primary storage. This eliminates a need to schedule time-windows for discovery point creation. Each discovery point includes incremental changes from the prior discovery point, including data object changes and the analytics gathered and associated with the data during such changes. Intelligent rules can be applied to automate discovery point creation, such that, in addition to manual or time-based creation, discovery point creation may be triggered by content changes. Such changes may be percentage based, specific to percentage change of certain identifiable subsets of the entire data pool, based on detected deviations from usage patterns such as increase in frequency of specific accesses, or based on real-time analysis of data content.

At the creation of a discovery point, the change catalog accumulating real-time changes is closed. The change catalog is then stored within the created discovery point, and a new change catalog created for changes to be associated with a next created discovery point. The analytics and data stored within discovery points enable efficient restores, allowing search over multiple discovery points for specific object changes without requiring restoration of the data objects from each discovery point. Such search can be based on any analytics performed, such as data tracked in the extended metadata and content-based analysis performed by application of the Rule Engine. The tracking further enables indexing and partial restores—for example specific objects, or embedded objects within complex objects, can be restored from a discovery point without a complete restore of all data from that discovery point.

Data Intelligence 452

Data Intelligence is a set of analytics at the Intelligence Node analyzing content. Data Intelligence operates through the Rule Engine, and can be applied to unstructured data, for example file metadata such as document properties of Microsoft Office documents or the actual content of such documents, semi-structured data such as log files or specific applications such as Mail programs, structured data such as databases or other formats for which schema may be known or discovered by the system, and recursive containers such as virtual machines, file systems on file systems, file systems on volumes, or archives.

Multi-Threaded Transaction Log

File systems use internal data structures, called metadata, to manage files, directories and data in files. A typical file system uses logging to guarantee crash consistency. One of the popular techniques to guarantee crash consistency is a write-ahead log. Before modifying metadata, the file system logs the intent of modifications to the log, and then performs the metadata modifications on disk. In case of a panic, power failure, or crash, the log is then replayed to bring the file system back to a consistent state.

Figure 7:
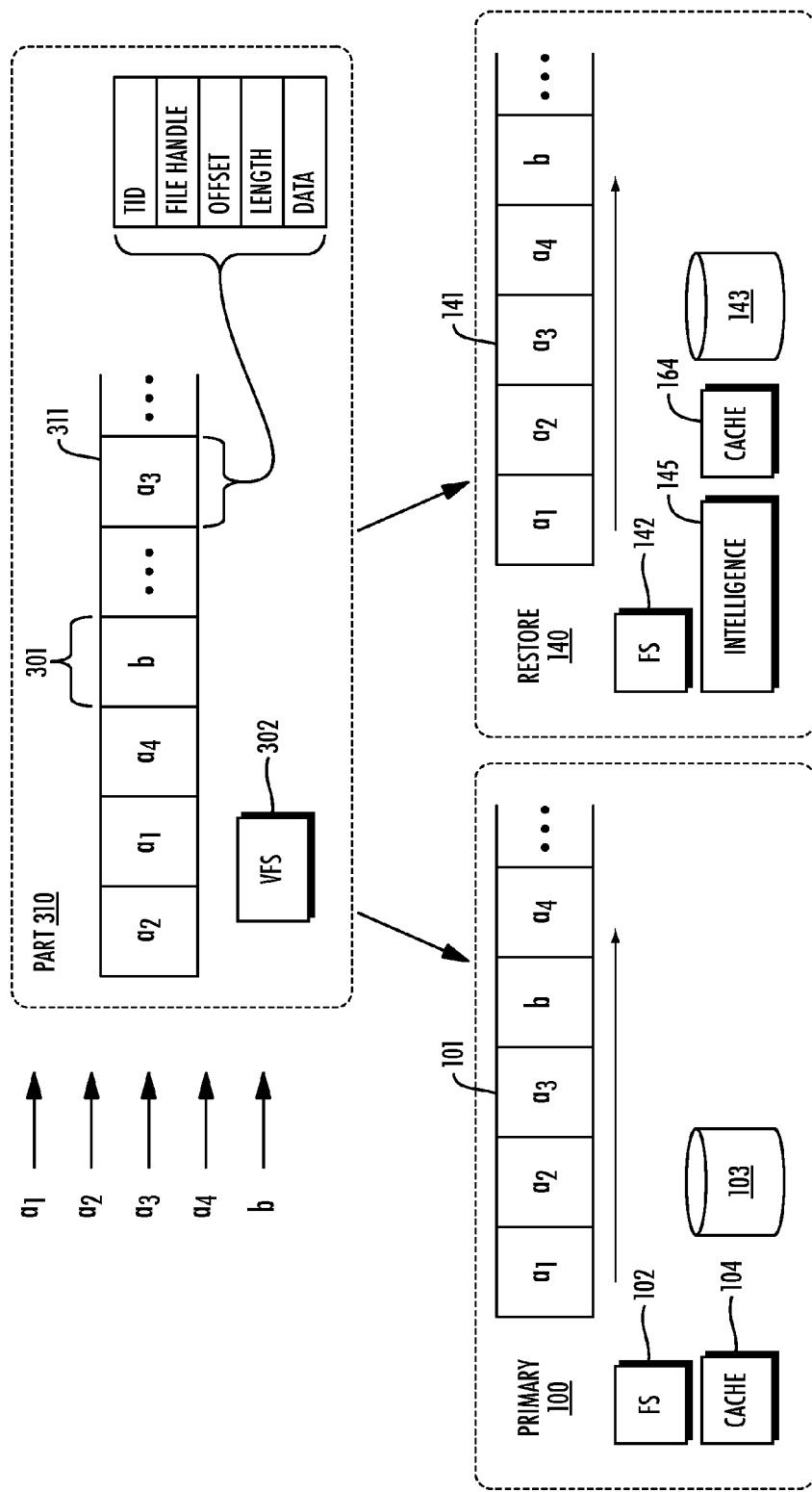
FIG. 7 is a diagram illustrating a multi-threaded log.

Consider a high availability, data intelligence environment as shown in FIG. 7. As explained above, the PART 310 intercepts data access requests, forwards them to a primary node, mirrors them to a high availability restore node, and performs analytics to create intelligence data. During these operations, each of the primary node 100 and restore node 140 operate with their own independent file system 102, 142 (FS). It should be understood that the file systems 102, 142 may be a ZFS-compatible file system or some other file system.

Certain types of file systems (FS) on each of the primary 100 and restore 140 may maintain their own local log (101, 141) of transactions; however other file systems may not maintain such local logs 101, 142 or may find it convenient to disable them. Also, when such file system transaction logs (101, 141) might typically be single threaded such that all log writes are guaranteed to be sequential. A logged transaction includes all the metadata modifications that will be done as part of an I/O. For example, if an I/O operation allocates on indirect block, the log entry in 101 or 141 consists of the new allocated indirect block, the parent indirect block where the new block will be inserted, an offset in the parent indirect block, the inode where associated with the indirect block, and so on.

Since some transactions take longer than others to process, the single threaded, sequential log process delays any subsequent log transactions from being entered when the log is busy with a prior task.

In a preferred implementation, the PART 310 maintains its own log 311 independent of the logs 101, 141, if any, as maintained by the file systems 102, 142 in primary 100 and restore 140 nodes. This PART-level, "virtual file system" log 311 is implemented in a durable storage medium that can be written to in random order, such as nonvolatile memory. To achieve crash consistency, access requests can be replayed at the primary 100 and restore 140 nodes consistent with the original order in which they were received at the PART 310. In some implementations, the PART log 310 may obviate the need for logs 101, 141, which then may be disabled or bypassed if the file systems 102, 142 allow this.

More specifically, any metadata in the PART log 311 is stored with a corresponding transaction ID. The transaction IDs are a unique number maintained by the PART 310 and incremented upon each access request received. Writes to the PART log 311 may therefore be multithreaded such that they can be written any time and in any order, with the order information retained in the transaction ID associated with each request.

FIG. 7 shows a typical PART log entry including a transaction ID, an operation type, a file handle, offset, length and data. The entries in the PART log 311 are arranged in a number of chunks 301 typically with each chunk being of equal size to other chunks.

As mentioned previously, access requests received by the PART 310 may be multithreaded. The various chunks 301 in the PART log 311 enable log entries to be written in any order and also concurrently. As a result, writes to the random access, high speed PART log 310 do not have to observe any ordering dependencies, yet the ordering can be regenerated when the PART log 310 is replayed to the primary and restore nodes.

In one example shown in FIG. 7, the PART 310 is executing five (5) concurrent threads labeled A1, A2, A3 and B. In this example, some of the threads are issuing access requests for a data tree structure that is to be populated with engineering data concerning the configuration of a manufactured component. Other threads executing in the PART 310 are concerned with processing customer orders for the component. For example, a first thread A1 may be responsible for creating the tree while threads A2 and A3 are responsible for writing data to the tree. In this example, thread B is handling an entirely different operation such as supporting database accesses concerning the customer orders for the component. Thus it should be understood that some of the accesses (those initiated by threads A1, A2, A3) will ultimately have to be executed in a certain order at the primary 100 and restore 140 nodes, but other accesses (thread B) can be handled in any order at the primary 100 and restore 140 level.

However, regardless of the order in which the accesses must ultimately be executed at the primary 100 and secondary 140, the accesses can be written to in any order in the PART log 311. This is because, as previously described, the transaction ID numbers are assigned to each access request in the order which they are received. This then enables the transactions to be executed in the correct order in the local file systems 102, 142, even though they may have been originally stored in random order by the multiple threads executing at the PART level 310.

After each access request is written to the PART log 311, it is forwarded in parallel to each of the primary 100 and restore 140 nodes. The primary 100 and restore 140 nodes then copy the request data to a respective local cache 104, 144, but do not yet actually issue the request to their underlying file systems 102, 142 to access permanent storage such as respective disks 103, 143. Without the PART log 311, such behavior by primary 100 and restore 140 nodes would not provide crash consistency locally within file systems 102, 142, and also does not provide consistency between file systems 102, 142.

At some time when the number of entries in the PART log reaches a certain number (such as when the PART log 311 is nearing a full condition), the PART 310 issues a synchronization ("sync") request to the primary 100 and restore 140. Upon receipt of the sync request, the primary 100 and restore 140 flushes their respective cached data to disks 103, 143. The primary 100 and restore 140 then acknowledge the sync back to the PART 310. With the data now confirmed as having been being persisted on disk by both the primary and restore nodes, the PART 310 can now free the corresponding chunks 301 in PART log 311. In other words, it is not until the sync command is complete that data related to the requests is known to be correctly persisted to respective disks in the primary and restore nodes.

Figure 8:
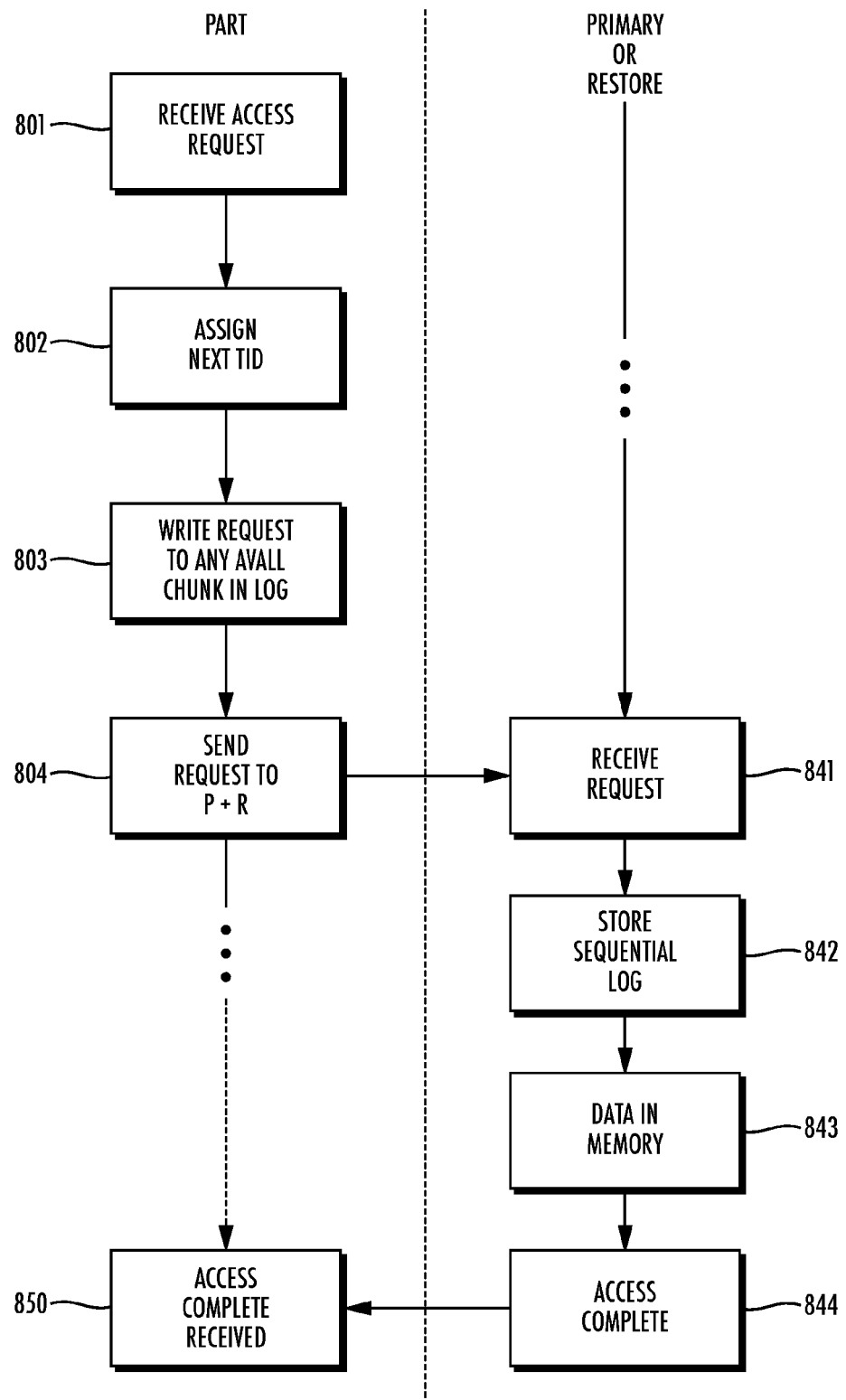
FIG. 8 shows a process flow for handling an access request at the PART.

FIG. 8 shows a typical process flow among the PART 310 and primary node 100. It should be understood that the corresponding operation between the PART 310 and the restore node 140 is similar. In a first step 801 the PART 310 receives an access request from a host. In a next step 802 the PART assigns a next available transaction ID to the request. At step 803, the access request is then written to any available chunk in the PART log 311. In next step 804, the request is then sent to both the primary 100 and restore 140 nodes.

In step 841 the primary 100 receives the request from the PART 310. In a next step 842, if the primary 100 and restore nodes maintain a local log 101, 141, they determine a place for the transaction in their respective log order from the transaction ID (which is known to have been assigned in the same order in which multithreaded PART receive it). At this point in state 843 data associated with the request is stored in the primary's local cache memory 104,144. Although data is not yet stored on disk, in state 844 the primary can send an access complete acknowledgment back to the PART 310. In state 850 the PART 310 can then report that fact that the access is logically complete even though the data has not yet been flushed to disk at the primary 100. This permits the client application which is accessing the PART 310 to continue its logical flow even though the data has not yet been physically flushed to disk. It should be understood from the foregoing that multiple instances of this process can occur in parallel, owing to the multi-threaded nature of the PART log 311 which supplants the single-threaded logs 101, 141.

Figure 9:
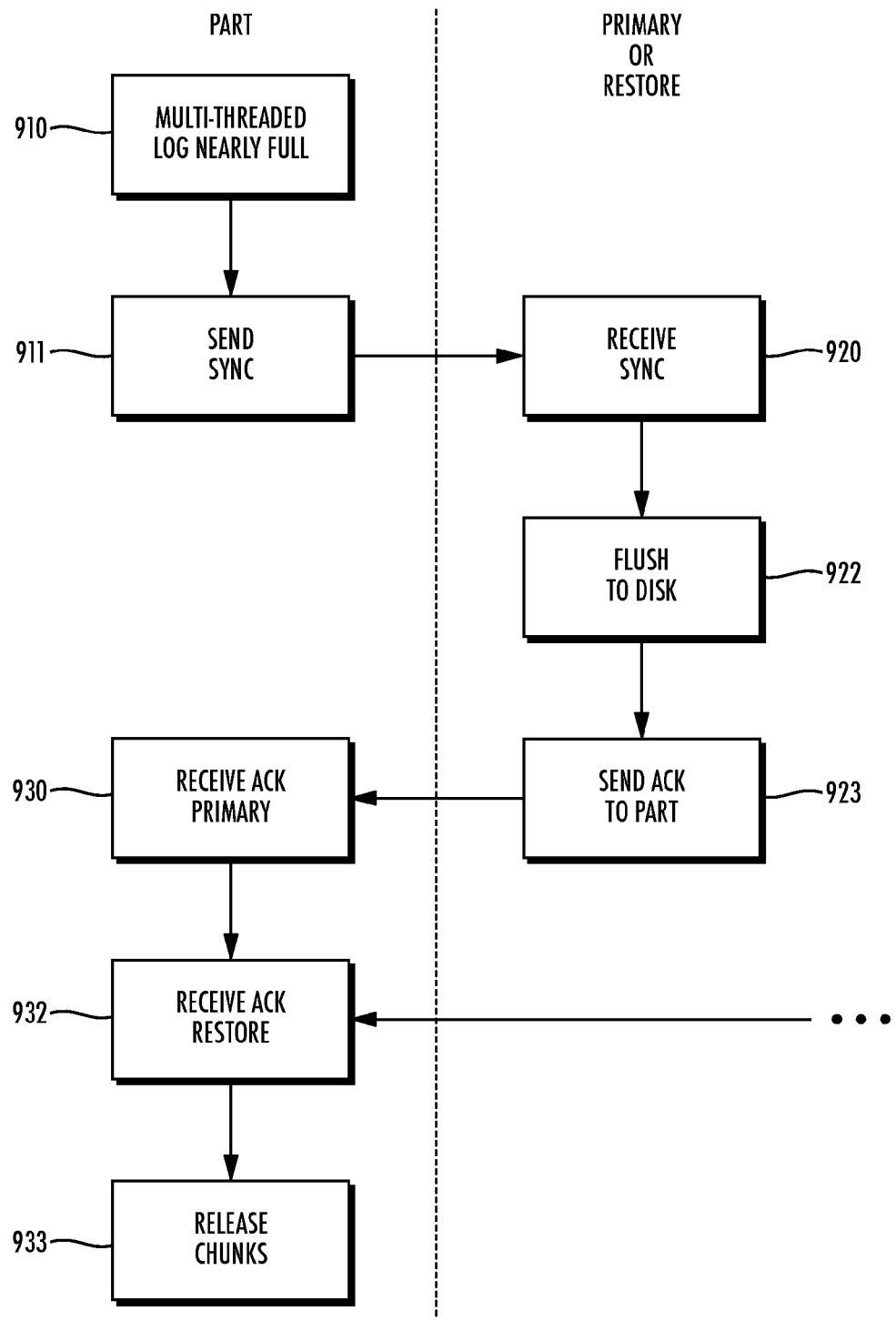
FIG. 9 shows a process flow for synchronizing requests to release entries in the multi-threaded log.

FIG. 9 illustrates the process flow between the PART 310 and the primary 100 and restore 140 when the multithreaded log 311 is full or nearly full. In state 910 the PART 311 log is recognized as no longer being able (or soon to become unable) to store additional requests. In step 911, a sync command is sent from the PART 310 to both the primary 100 and restore nodes 140. In state 920 the primary 100 (or restore node 140) receive the sync command and in state 922 they flush their local cache to permanent file system (FS) storage such as one or more disk(s). Once the flush operation is complete in state 923, an acknowledgment can then be returned to the PART 310.

In state 930 the PART receives the acknowledgment from the primary 100, and at some point (either prior to, at the same time, or subsequent to state 930) the PART 310 also receives an acknowledgment from the restore node 140. In state 933 having received flush acknowledgments from both the primary 100 and the restore 140, the PART 310 can finally release the associated chunks 301 in PART log 311.

As a result, even when log entries are not recorded in PART log 311 in the same exact order in which they are issued to the primary 100 and restore 140 nodes, the transaction IDs can be used to replay the log in the same order as the original writes occurred. The durable storage used for the PART log 311 is a fast access storage device, such as a solid state device, so that the log file can be sorted in transaction ID order as quickly as possible when it needs to be read back, such as when a fault occurs before data is flushed to disk by both the primary 100 and restore nodes 140.

This results in guaranteeing file system consistency at the higher system level, and without relying on the standard log operations within the file systems implemented in both the primary node 100 and restore node 140. This also guarantees data synchronization and metadata consistency between the primary node 100 and restore node 140, even in the event of an error occurring prior to cache flushing. Furthermore, in a case where primary and restore maintain their own logs 101, 141, the PART log 311 in effect becomes a virtual file system (VFS) log that supplants the operation of local logs 101, 141.

Write Gathering at Virtual File System Layer

Figure 10:
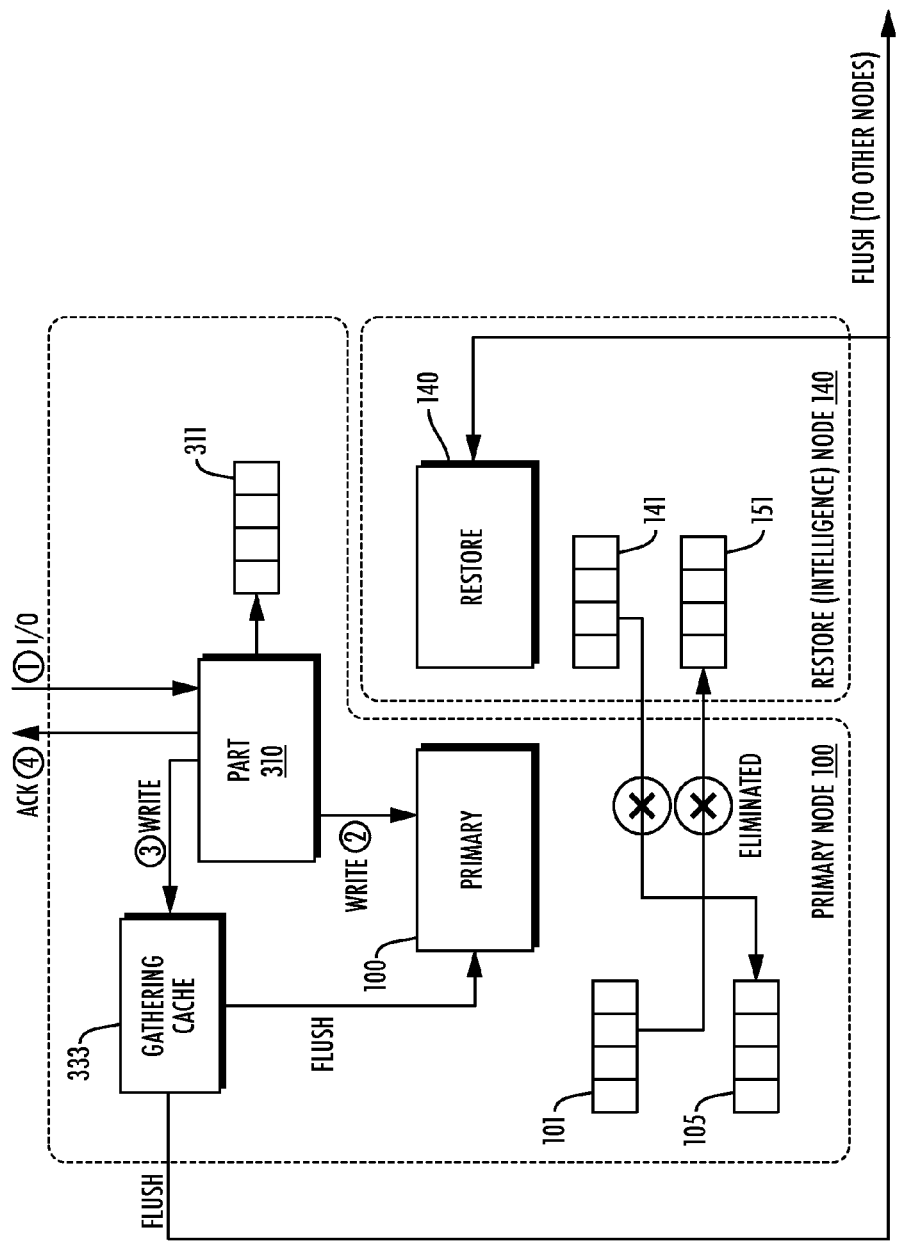
FIG. 10 shows write access gathering at the PART.

It is typical for a storage system to aggregate write operations in a cache before being flushed to main storage. Consider the environment shown in FIG. 10. As with the systems described above, a data intelligent storage system is implemented with a primary node 100 and high availability/intelligence data stored at restore node 140. In a typical I/O operation, a write access request may come into the PART 310, and recorded in a PART log 311 before being forwarded to primary 100 file system and restore 140 file system. In an optional arrangement the primary and restore file systems may maintain their own logs 101, 141 as previously described. In such an arrangement, those file system level logs 101, 141 are also copied to a remote disk such that it another remote copy 151 is made of the primary log 101 and another remote copy 105 is made of the restore log 141. As a result, each single I/O transaction may result in many different write operations to different primary data stores and logs.

We have realized that efficiency can be obtained by also gathering write accesses at the PART 310 layer above the FS layers (102, 142) distributed to multiple nodes. A PART level cache, which we refer to as a write gathering cache 333, is implemented to store data associated with write requests. Thus when a write transaction comes into the PART 310, the associated data is immediately copied to the write gathering cache 333, and the I/O request is also acknowledged. Certain other operations that involve metadata, such as a make directory (mkdir) operation, are first logged in the PART log 310 and then issued to the primary 100 and restore 140.

Writes are then aggregated in cache 333 until such time as the cache 333 needs to be flushed to the restore node 140. At this point, for example, a sequence of transactions has resulted in multiple writes to the same block, the cache location associated with that block will be overwritten multiple times. Flushing of the gathering cache 333 will only then require a single write of that block, thereby reducing the total number of write operations to the restore file system 140. As part of the cache flushing, additional copies can be sent to still other nodes, such as to provide remote replication.

Virtual File System Supporting Subdirectory Snapshots and Other Actions

Figure 11:
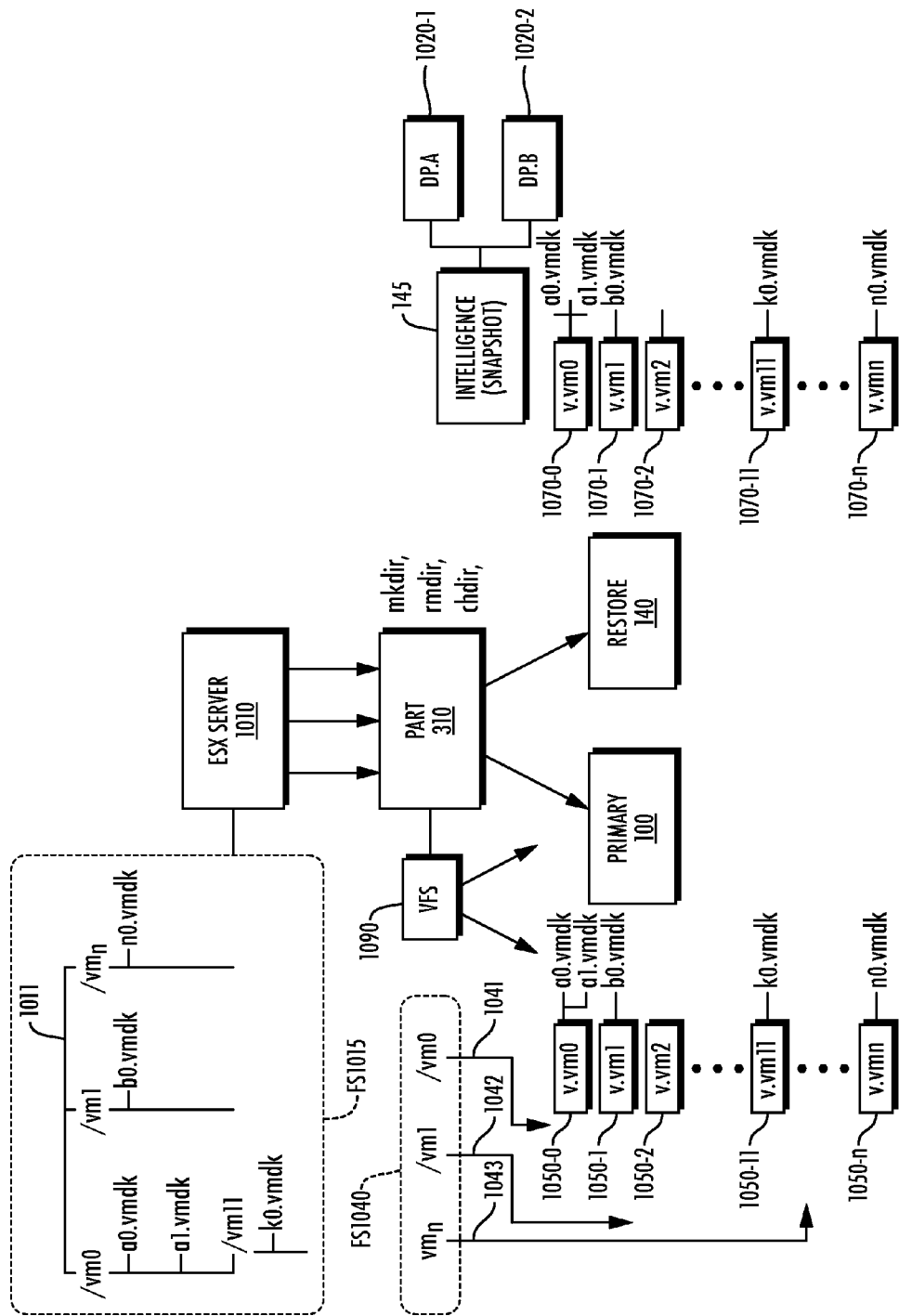
FIG. 11 shows virtual file system objects representing virtual machine subdirectories created by a hypervisor application can be submitted to a snapshot process.

FIG. 11 shows the data intelligence storage system being accessed by one or more applications 1010. In the particular example illustrated, the application 1010 is a hypervisor environment such as an ESX or ESXi server (ESX and ESXi are trademarks of VMware, Inc. of Palo Alto, Calif.). The application 1010 creates and maintains various virtual machine (VM) files in such an environment on a subdirectory basis. For example, the application 1010 expects a first virtual machine (VM0) to be disposed within a first subdirectory (/vm0), and includes associated virtual machine files a0.vmdk, a1.vmdk, etc. The files associated with a second virtual machine (b0.vmdk) are to be disposed within second directory (/vm1), and the files associated with an (n−1)'th virtual machine in subdirectory (/vmn). The files (k0.vmdk) associated with yet another virtual machine are to be stored in a directory (/vm11) that is subordinate to directory /vm0. As can be seen, the ESX server application 1010 may therefore be hosting a number of virtual machines; the data associated with each virtual machine including its operating system image files, application files and associated data are stored in one or more files arranged in a directory tree 1011 within a single file system 1015 tree.

As with the other data intelligence environments discussed herein, application 1010 issues access requests to the PART 310. In turn, PART 310 not only sends the access request to one or more file systems on primary node 100, but also sends the access request to the file system(s) on restore node 140.

As explained above it also becomes desirable to use intelligence 145 in the restore node 140 to perform certain tasks. One such task creates intelligence data in the form of a change catalog entry with associated discovery points (1020-1, 1020-2). In the scenario shown in FIG. 11, these discovery points 1020 may include snapshots of the state of the virtual machine files and their associated data, metadata, other intelligence data, and change catalog. As also explained above, snapshots become discovery points includes one or more snapshots of each VM.

While certain applications such as the ESX server 1010 store their associated files in a tree structure 1011 containing different subdirectories, the file systems implemented with primary 100 and/or restore node 140 may not easily support taking a snapshot of just a single subdirectory and therefore of just a single VM. Such existing snapshot technologies are directed to instead storing a snapshot of an entire file system. However it may be desirable in certain circumstances to enable the use of such snapshot technologies on a single VM.

The basic idea is for PART 310 to identify particular applications such as ESX server 1010 that create subdirectories, such as those containing virtual machine files, and manage them in a distinct way. The PART 310 therefore can more efficiently enable certain actions by intelligence 145. As shown in FIG. 11, as it handles access requests, the PART 310 maintains an entire set of filesystems 1050 for each sub-directory on the primary 100 and an entire set of filesystems 1070 on the restore 140. What appears to the user application (ESX server 1010) to be an ordinary filesystem containing ordinary subdirectories is actually a virtual filesystem 1040 wherein any given subdirectory may actually be a link to a separate, associated file system that actually contains the .vmdk files for a given VM.

When these subdirectories are accessed in the virtual file system 1015, the PART 310 thus transparently redirects those accesses to the associated file system(s) 1050, 1070 on the primary and restore. In one example, a make directory (mkdir) command to create VM subdirectory /vm1 is intercepted by the PART 310, which then creates file system v.vm1 (1050-1) on the primary 100 and its mirror v.vm1 (1070-1) on the restore node 140. The PART 310 then creates the new file system directory /vm1 in the primary filesystem 1040, which is a virtual "mount point" linking the subdirectory /vm1 in virtual file system 1015 with its associated actual file system v.vm1 (1050-1, 1070-1). This link is denoted by pointer 1042. In another example, a write access directed to file /vm0/a1.vmdk is intercepted by the PART 310, which, following link 1041, redirects that write access to the filesystem v.vm0 (1050-0) on primary 100 which actually contain the file a1.vmdk. As described in the other patents incorporated by reference above, the PART 310 also mirrors write accesses to the restore node 140; in this case, the mirrored write access is directed to the filesystem v.vm0 (1070-0) on the restore node 140 which actually contains the mirror of a1.vmdk.

In effect, the PART 310 maintains the illusion of a subdirectory tree 1011 but actually creates a number of file systems 1050-0, 1050-1, 1050-2, . . . , 1050-11, . . . , 1050-n on primary 100 and a number of file systems 1070-0, 1070-1, 1070-2, . . . , 1070-11, . . . , 1070-n on restore 140.

It is possible that not every subdirectory will be given this treatment, depending on the desirability of having separate access for PART 310 to implement snapshots of certain subdirectories.

When the need arises to take a snapshot, the snapshot processes running as part of intelligence 145 can be executed using the standard file system oriented snapshot process but using the virtual mount point information to locate the underlying filesystems 1070 associated with a given subdirectory. In effect, the virtual filesystem (VFS) 1090 hides the existence of multiple independent, "container file systems" from user application 1010. Subdirectories in the virtual file system (VFS) 1090 are accessible as subdirectories, but at the same time the underlying container file systems 1070 are accessible to the snapshot processes. Associated file system snapshot technology in the restore node 140 can now be relied upon to obtain snapshots of a given VM independently of snapshots of other VMs, and the restore node 140 can thus treat them as it treats any file system.

In addition, the details of the virtual file system 1090 framework is hidden from the ESX server 1010. In particular, directory-associated access requests made to the system, such as a make directory (mkdir) or remove directory (rmdir) or change directory (chdir) command, are intercepted by the PART 310. Upon receiving a mkdir command, the PART 310 layer then issues requests to primary 100 and restore 140 to create the file system constructs v.vm0 (1050-0, 1070-0), v.vm1 (1050-1, 1070-1), . . . , v.vm11 (1050-$k$, 1070-$k$), . . . , v.vmn (1050-$n$, 1070-$n$) and associates them with links (1041, 1042, 1043) to the actual virtual machine files and subdirectories as expected by the ESX server 1010. Upon receipt of a rmdir command, the corresponding v.vm structure(s) can be removed from or edited within the VFS 1090 data structure. This shadow virtual file system 1090 is in effect, created and maintained via processes internal to the PART 310. The virtual mount points in VFS 1090 are thus accessed by the snapshot processes 1020-1, 1020-2, but the subdirectory structures remain in place for other I/O requests as received from the ESX 1010.

Figure 12:
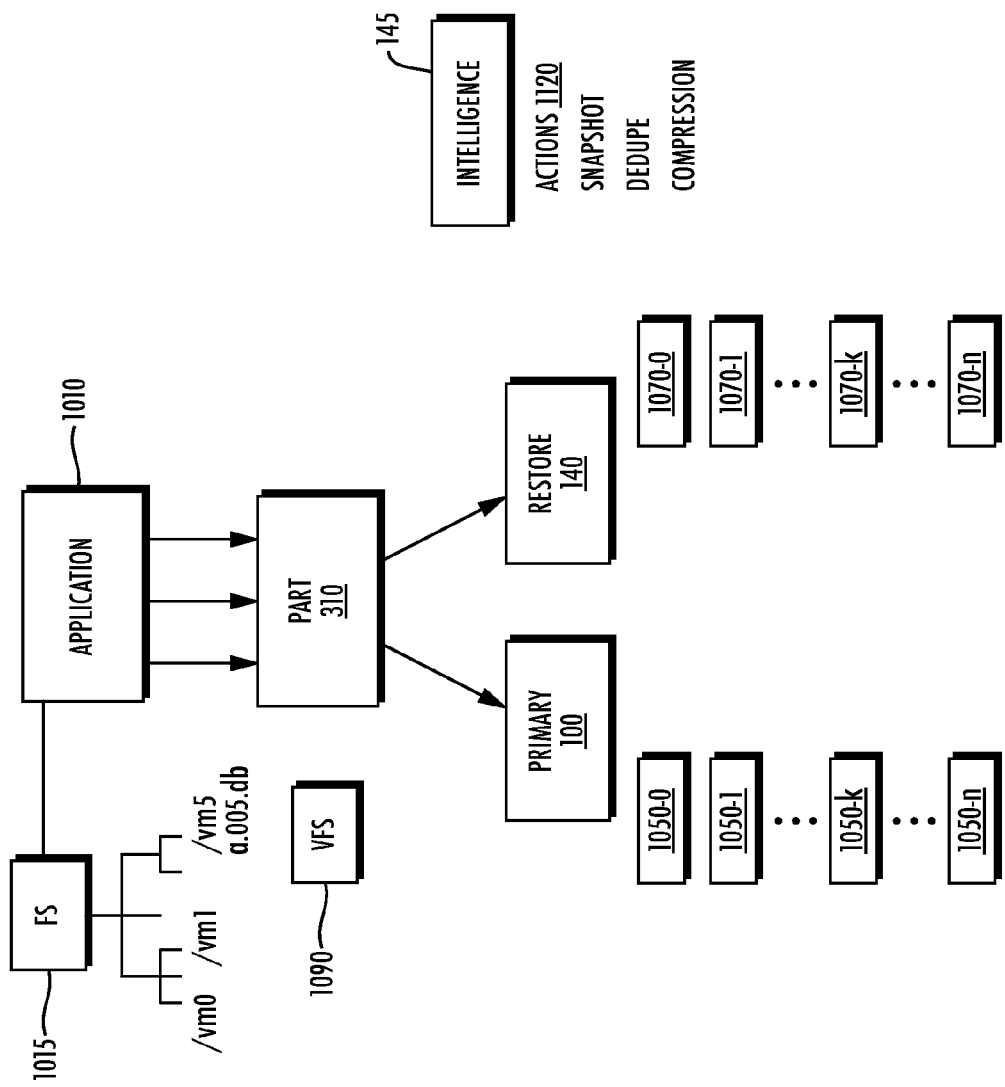
FIG. 12 shows a more general case where an action is applied in a restore node across subdirectory trees and file objects stored within those directories.

FIG. 12 illustrates a more general case where restore node 140 applies a storage related action 1120 (such as snapshot, de-duplicate, compression, or some other storage related action) to portions of a file system (such as a subdirectory 1016) rather than an entire file system 1015 created by application 1010. Here, a virtual file system (VFS) layer 1090 in the PART 310 again used to provide links between file systems and the subdirectories 1011, 1012 associated with these file systems.

In one such example, the application 1010 may wish to apply a de-duplicate action only to a particular sub-subdirectory 1016. Thus, even when the underlying file systems provided by primary 100 and restore 140 does not permit such access granularity, a "no de-duplicate" property can be maintained in the VFS 1090 by PART 310 for that subdirectory, because it is a virtual mount point linking to an actual underlying file system 1070-*k* upon which the property can be applied.

Thus the techniques described herein can be applied wherever it is desirable to apply a property only to portions (or at some granularity such as a subdirectory) of an underlying file system, even when the file system itself limits access to such portions or at such granularity.

In another example, the PART 310 may apply properties to the virtual machine subdirectories in consistency groups. So, for example, the VFS 1090 maintained by PART 310 may further indicate that the virtual subdirectories (1070-0, 1070-1) for two of the VMs (such as /vm0 and /vm1) are to always be treated together and subjected to the same snapshot policies.

In other scenarios, the VFS 1090 may be exposed to analytics running in the restore node 140. The results of those analytics can then be used to determine how to further refine the directory structure(s) 1050 and/or 1070. As one example the intelligence process 145 in the restore node may detect the application 1010 accesses files in a particular way which indicates some need to apply a certain scope to a given action. In another example, the intelligence 145 may determine that a certain virtual machine contains a sub-sub-directory /vm5 that is type of database (a.005.db) having contents that are known to change often and thus will not benefit from compression. Thus intelligence can maintain a compression property when accessing the virtual directory structures in VFS 1090 to exclude sub-sub-directory /vm5 from any compression action.

Cloning with Thin Provisioning and Background Live Restore

It can be desirable from time to time for a user to request that complete duplicate or clone of an existing file system object be created. In one scenario, a user may wish to create a clone of a prior snapshot that contains prior obtained intelligence data, to perform still further analytics. In another instance, the clone may be needed to recover a failed file system. In still another instance, the user may simply wish to copy an object from one file system to another without destroying the original object.

Figure 13:
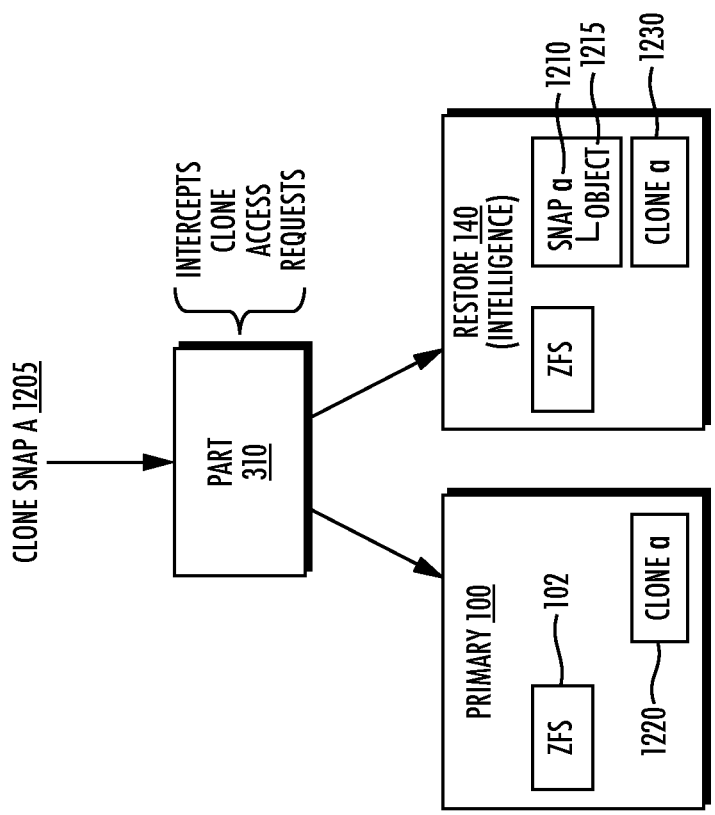
FIG. 13 is a high level diagram of a system that provides clone on demand with background migration of data and metadata.

As with the systems described above, in a typical scenario such as shown in FIG. 13, a primary node 100 stores primary data and restore node 140 stores associated intelligence data and other information. In one example, the object 1215 to be cloned may reside within snapshot ("snap") 1210; this object 1215 may be a file, a directory or even the entire file system within the snapshot 1210.

The basic idea is that when a clone request 1205 is made to the PART 310, it does not simply forward the request to the file systems 102, 142 on primary 110 and restore 140 nodes. Instead, a new file system clone object 1220 is immediately thin provisioned on the primary node 100 and exposed by the PART 310 to the user (host), and a new file system clone object 1230 is also thin provisioned on the restore node 140 (which is consistent with the system's usual process of mirroring requests to the restore node 140, although that step is not critical to handling the clone request as described herein). The PART 310 therefore does not have to first actually populate all of the metadata and data to the new file system clone objects 1220, 1230. Even without all of the metadata and data actually being populated, users can start to issue requests to access the cloned file system objects 1220, 1230.

As file system requests are made to the clone file system objects 1220, 1230, the metadata and data associated with the clone file system objects 1220, 1230 are restored as needed. Background processes are also employed to copy metadata and data to the clone file system objects 1220, 1230.

The PART level 310 thus coordinates execution of a clone process rather than pushing the clone process down to an FS 102, 142 or other file system layer in the primary 100 and restore 140 nodes.

Figure 14:
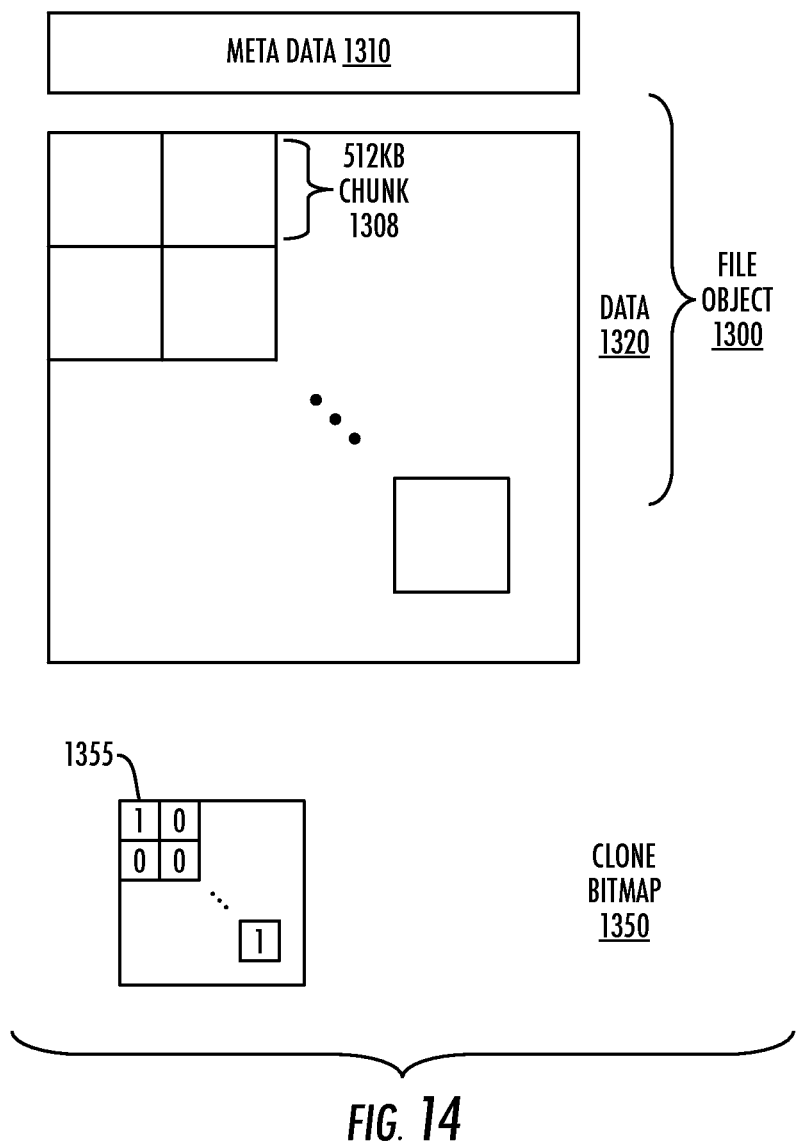
FIG. 14 illustrates a file object and corresponding clone bitmap.

A situation where the object to be cloned is a single file will be first discussed in connection with FIG. 14. In this example the file object 1300 to be cloned consists of a metadata portion 1310 and a data portion 1320. The particular structure of metadata 1310 depends on the type of underlying file system, and will be different for a Linux file system, than say, a Windows or MAC OSX file system as is known in the art. The data portion 1320 can be considered to be a collection of data bytes of a certain size, such as chunks 1308 each of 512 kilobytes (kB). A clone file process executed in PART 310 maintains a clone bitmap 1350 for each such cloned file object 1300. The clone bitmap 1350 includes at least a single bit 1355 for each chunk 1308 in the file object 1300. The clone bitmap 1350 is used as a tool to coordinate the status of actually copying portions of the data 1320 from the original file to the cloned object.

Figure 15:
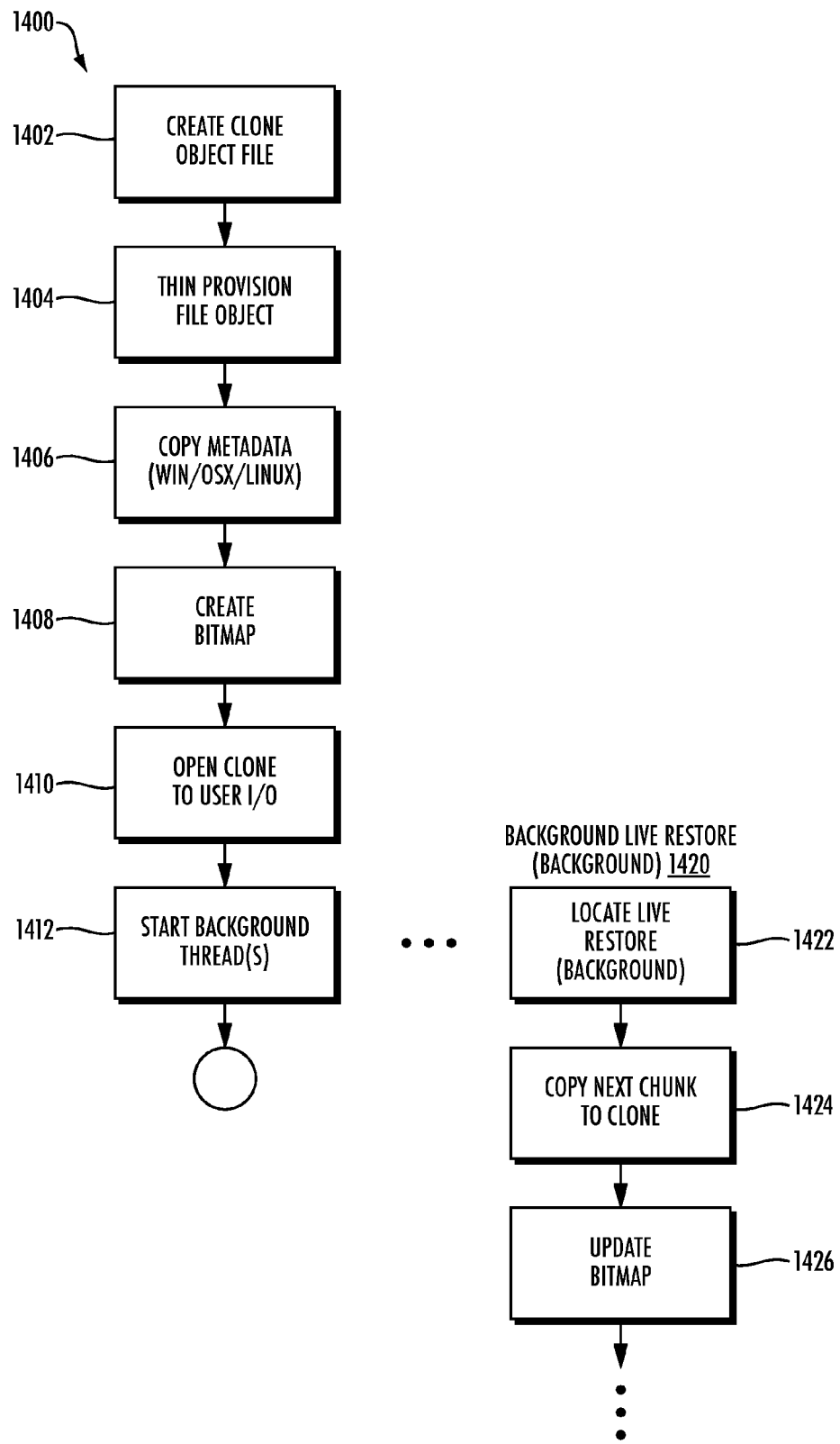
FIG. 15 is a process flow for creating a clone of a file object.

FIG. 15 is an example flow for a clone process 1400 where the cloned object is a single file. In a step 1402 a request is received at the PART 310 to create the cloned object. In the next step 1404 a new clone object 1220 is created on the primary node 100 and a new clone object 1230 is created on the restore node 140, but only thin provisioned, without actually copying any data yet. The thin provisioned file objects at this point may contain some metadata in state 1406 depending upon whether or not the underlying file system maintains metadata within the file object itself (certain operating systems such as Windows and MAC OSX do this; other operating systems such as Linux maintain file metadata as part of a separate inode). In either event, in the next state 1408 the bitmap 1355 is created for the file with all bits therein set to logical "false" value indicating that the corresponding data for chunk has not yet been populated to the clones.

In state 1410 the new clone file objects 1220, 1230 are made accessible for subsequent input/output (I/O) requests by the user I/O even though no data portion 1320 has yet to be copied from the source snap 1210.

In a next state 1412 a background live restore thread 1420 is started. The live restore thread 1420 may typically be a background thread executing only when the PART 310 is otherwise not executing other tasks. In other instances, the live restore thread 1420 may be a thread with low priority (keeping in mind that the PART 310 is a multi-threaded processor as described above).

The purpose of the live restore thread 1420 is to perform the task of copying data from the source snap 1210 to the clones 1220, 1230. Thus in state 1422 a next chunk is located. In state 1424 the next chunk is copied from the source snap 1210 to the clones 1220, 1230. And in a next step, the bit in the bitmap associated with that chunk is then set to a logical "true" value. The live restore process then continues as a background/low priority process as long as and until all chunks of the file have been copied to the clone.

Figure 16:
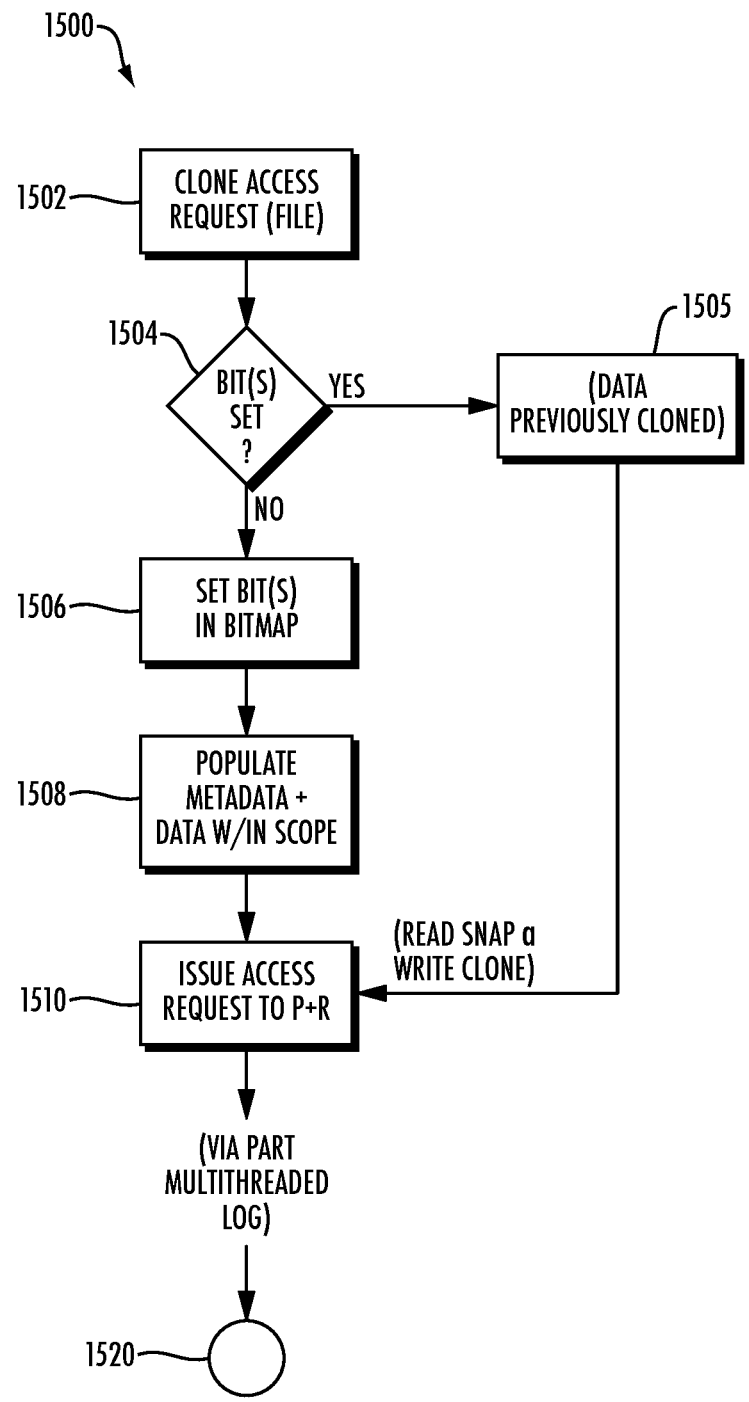
FIG. 16 is a process flow for accessing a cloned file object.

FIG. 16 shows a typical process 1500 performed when the PART 310 receives an access request for a previously thin-provisioned clone object. In state 1502 the clone access request is received. In a next step 1504, the clone bitmap 1350 associated with the clone object is consulted. If the bit or bits associated with the chunks accessed in the request are all set to "true", then that is an indication that the data has already been copied to clones 1220, 1230. Processing may proceed to step 1505 where the access request can be handled as per state 1510.

However if the access request refers to one or more chunks 1308 for which the bitmap 1350 indicate a "false" value and thus have not been previously processed, then in state 1506 the bitmap is updated to set those bits to "true". In state 1508, data and possible metadata affecting chunks within the scope of the request are then populated to clones 1220, 1230.

Regardless of whether state 1510 is reached from state 1508 or state 1505, the access request is then further handled. As explained above, the access request to the clone may be issued to both the primary 100 and restore 140 nodes. The access request may also typically be issued to the both the primary 100 and restore 140 nodes by the PART 310 using the multithreaded log process described above. This then results in duplicate copies of the clone 1220, 1230 being eventually instantiated on the primary 100 and restore nodes 140 once data is flushed from the caches.

Figure 17:
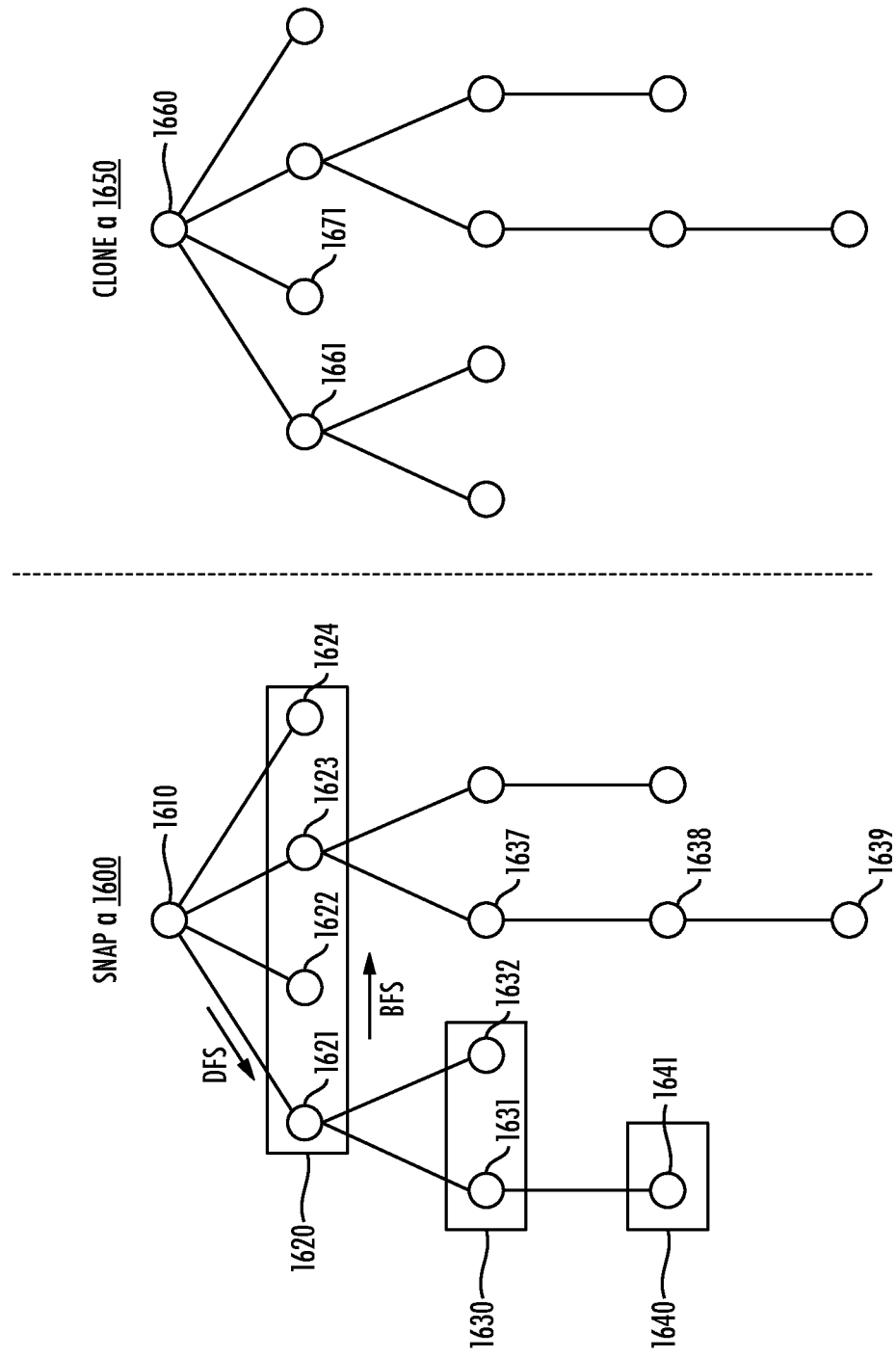
FIG. 17 shows a directory tree object and its corresponding clone.

A different process is executed when the object 1210 to be cloned is an object that includes more than one file, such as a directory or even an entire file system. Such an object, as shown in FIG. 17, may be represented as a tree or graph structure consisting of nodes and various levels with edges connecting the nodes. The node consist of values, such as metadata defining the content of an associated directory together with a list of references to child nodes and parent nodes that contain metadata for sub-directories and parent directories.

In the example shown in FIG. 17 the snap to be cloned is a root directory with several subdirectories and files stored within those subdirectories. The data structure 1600 thus consists of a root node 1610, and a first level 1620 consisting of four nodes representing four subdirectories 1621, 1622, 1623 and 1624. Each subdirectory contains pointers or other metadata concerning the files contained within, as is known in the art. The structure also includes the subdirectory at second level 1630 with further subdirectories 1631 and 1632 and files. Still further subdirectories are located at third level 1630 with respective files.

Figure 18:
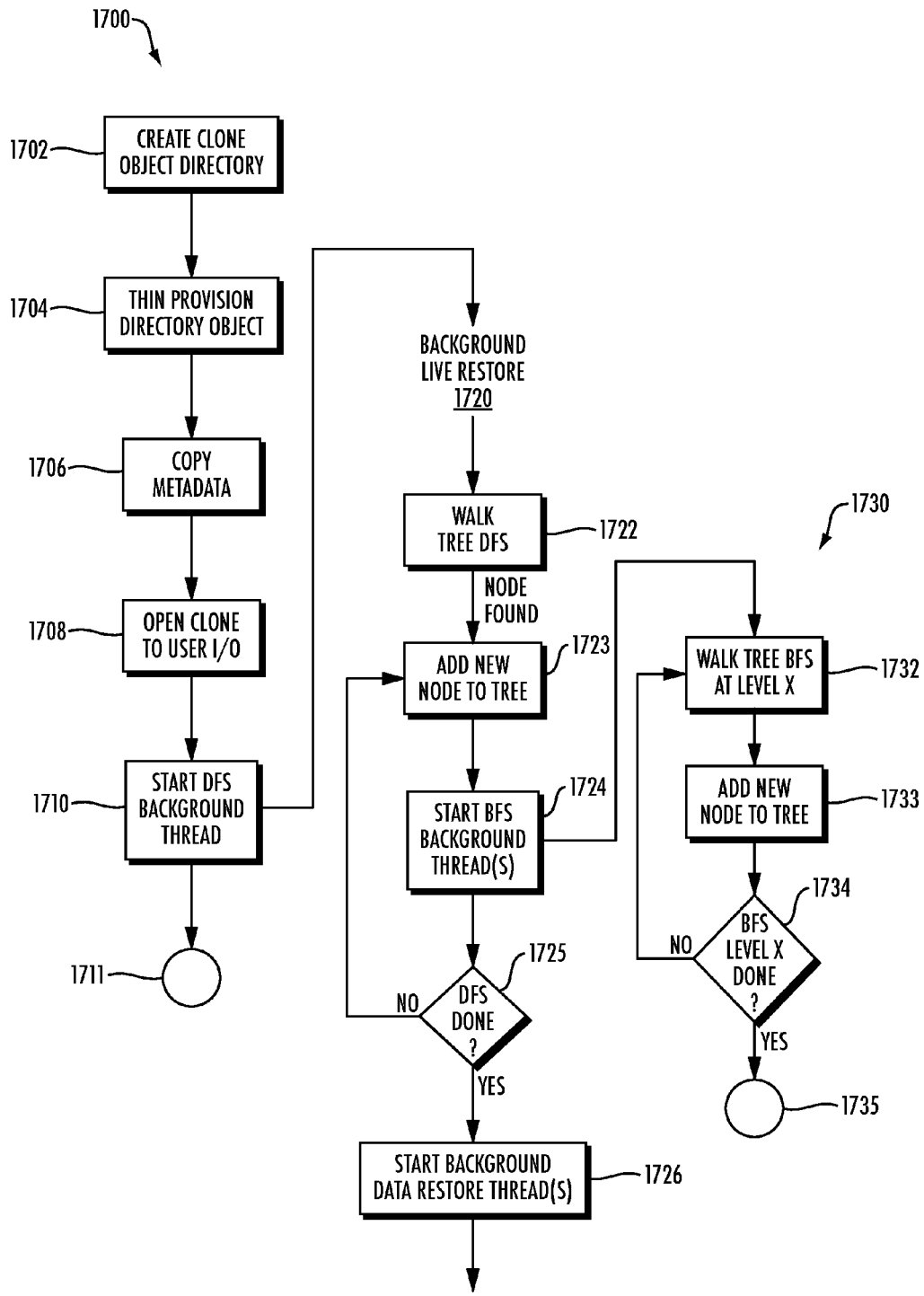
FIG. 18 is a process flow for creating a directory object.

The initial task when asked to clone such an object is to create a copy of the directory tree structure in the clone 1650 in a particular way. That process 1700 is shown in more detail in FIG. 18 and begins when a "clone directory" request is initially received in state 1702. In a step 1704 the PART 310 thin provisions the clone directory such as by only creating a copy 1660 of the root node 1610. In the next step 1706 metadata associated with the root node 1610 would also be copied as may be required by the particular type of file system (in the case of a Linux-compatible file system, that may include copying the inode for the directory). In state 1708 the clone object is then made available for user I/O.

In state 1710 a background and/or low priority live restore 1720 thread is kicked off for the directory object. In state 1711 processing may continue with the clone appearing to be available for access by the user but without any data and without even the entire tree structure having actually been propagated to the clone yet.

The live restore process 1720 for a directory object begins in state 1722. Here the directory tree for the original snap 1650 is walked in a depth first search. In the example of FIG. 16, the Depth First Search (DFS) from node 1610 would first located node 1621 for processing, then node 1631 and then node 1641 before returning to level two and node 1632 and so forth. In step 1723 the node that has been located in a depth first search is then added to the clone tree.

In state 1724 another background thread is also started concurrently with thread 1720. (It is understood that are explained above the PART 310 is a multithreaded processor and is capable of executing multiple concurrent threads at the same time). From state 1725, the background live restore process 1720 continues to determine if the depth first search locates any additional nodes, and if so, processing loops back to step 1723 to process the new node. If no new nodes are found in step 1725, then in state 1726 a background data restore thread (such as that described in connection with thread 1420 in FIG. 14) can then be triggered to restore data for the files referenced in the now cloned directory tree.

Returning to the background process and Breadth First Search (BFS) thread 1730, here the tree 1600 is then walked in a breadth first fashion at the current level. In the example of FIG. 17, when node 1621 is encountered at level 1 1620, the breadth first search will next locate node 1621. In state 1733 a corresponding new node 1671 is added to the clone tree. Processing continues with the test in state 1734 and looping back to state 1732 until the search of the current level in the tree is complete. Once this is done then the BFS background thread 1730 can terminate in state 1735.

Thus as the tree is populated in the clone using both a DFS-oriented live restore thread 1720 which initiates concurrent BFS-oriented live restore thread(s) 1730. It is also important to note that neither of the live restore threads 1720, 1730 actually populate the data content of the files in the directory object. It is still the case here that data is populated on only upon (a) actual access to the file (as per process 1500 in FIG. 15) or (b) when background restore process 1420 is kicked off after the tree structures are created.

It should be understood that there is typically some limit on the number of concurrent BFS threads 1730 at any one particular time, depending on the available processing power of the PART 310.

The above-described processes, with some adaptation, can also efficiently support "temporary" clones 1230. Creation and population of a temporary clone 1230 may use the same general mechanisms but with an observation that data in the temporary clone is not meant to be persisted for long. Thus when the temporary clone 1230 is opened for user I/O, the actual access might only store modified data in the temporary clone and continue to access the original snap 1210 for read accesses. This eliminates the need to restore all of the data in the snap 1210 to the clone 1230 but a synchronization mechanism can be observed through use of the bitmap 1350 for each file.

For example the background live restore thread need not be executed for the temporary clone; similarly, the temporary clone need not necessarily recreate all of the data, metadata and directory/subdirectory trees for which the user only requests read access. Thus it is only when a user wishes to perform a read-modify-write, the corresponding chunk(s) need to be fetched from the original snap, modified, and then only those chunk(s) written to the clone.

Figure 19:
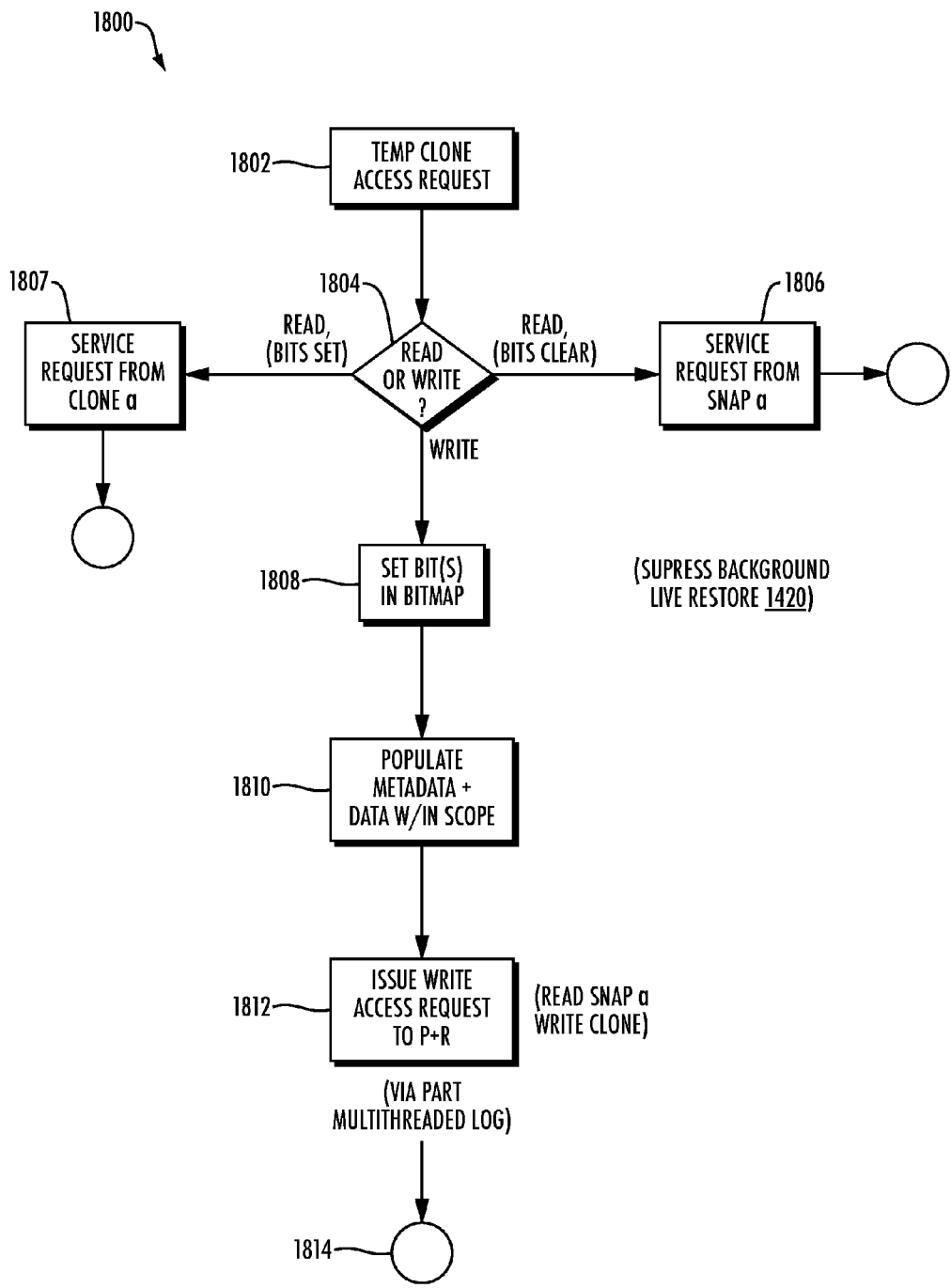
FIG. 19 is a process flow for accessing a temporary clone directory object.

FIG. 19 illustrates a typical temporary clone access process 1800 in more detail. It is understood that before this process 1800 is executed, a temporary clone structure has been created such as per the process 1500 in FIG. 16. In state 1802 an access request to the temporary clone is received. In state 1804 a determination is made as to whether or not the access request is a read or a write.

If the access request is a read, and if the corresponding bits in the bitmap are set to a logic false (indicating that there has been no prior write access to those chunks of the temporary clone), then the access request can be serviced in state 1806 from the original snap data structure 1210.

If the access request is a read, and if the corresponding bits in the bitmap are set to a logic true (bits set) (indicating that there has been a prior write access to those chunks, then the access request can be services in state 1807 from the clone structure 1230.

If however the access request is a write, then process 1800 proceeds to state 1808 with bits now being set in the bitmap. In state 1810 data (and metadata if needed) are populated within the scope of the request to the clone 1230. In state 1812 the PART 310 finishes the write request. As before, this may be performed via the multithreaded log process in the PART 310.

It is to be understood that the above description is intended to be illustrative, and not restrictive. Many other embodiments will be apparent to those of skill in the art upon reviewing the above description. As but one example, the algorithms specify general steps, or one specific way of implementing a function or feature. Those of skill in the art will recognize that other approaches are possible. It should also be understood that the algorithms described are directed to the primary logic needed to carry out the stated functions. They do not describe all possible variations in implementation; nor do they specify all possible ancillary functions needed for a practical system such as invalid user-supplied inputs or invalid operational states. For example, error states can be handled in any convenient way.

The scope of the invention should, therefore, be determined only with reference to the appended claims, along with the full scope of equivalents to which such claims are entitled.

The invention claimed is:

1. A method for processing in a data-intelligent storage system that includes a primary node storing primary data and in-line analytics, a restore node storing further analytics and intelligence, and a protection and analytics (PART) node, the method comprising:
receiving access requests from multiple concurrently executing threads at the PART node;
assigning a transaction identifier (ID) to each of the access requests;
logging the access requests at the PART node in a random access, multithreaded log; and
forwarding the access requests from the PART node to the primary node and restore node;
storing data associated with the access requests in a primary cache memory at the primary node;
storing data associated with the access requests in a restore cache memory at the restore node;
determining when a number of access requests in the random access, multithreaded log reaches a predetermined number;
issuing a synchronization command from the PART node to the primary and restore nodes;
in the primary node, flushing data from the primary cache memory to storage associated with a first file system in the primary node;
in the restore node, flushing data from the restore cache memory to storage associated with a second file system in the restore node; and
after flushing data in the primary and restore nodes, releasing entries in the random access, multithreaded log.

2. The method of claim 1, further comprising:
logging access requests within a first single threaded sequential log at the primary node; and
logging access requests within a second single threaded sequential log at the restore node,
wherein the logging of access requests at the primary node and the logging of access requests at the restore node occur independently of the logging of access requests at the PART node.

3. The method of claim 1, wherein the primary and restore cache memory in the primary and restore nodes, respectively, comprise volatile random access memory and wherein the storage associated with each of the first and second file systems comprises disk-based storage.

4. The method of claim 1, additionally comprising:
prior to flushing data to at least one of the first and second file systems,
determining a failure condition is occurring in at least one of the first and second file systems; and
replaying the random access, multithreaded log in an order determined by the transaction IDs to bring at least one of the first and second file systems to a known consistent state.

5. The method of claim 1, additionally comprising:
gathering write data at the PART node independently of the caching within the primary node and independently of the caching at the restore node.

6. A method for processing in a data-intelligent storage system that includes a primary node storing primary data and in-line analytics, a restore node storing further analytics and intelligence, and a protection and analytics (PART) node, the method comprising:
receiving access requests at the PART node from multiple concurrently executing threads;
assigning a transaction identifier (ID) to each of the access requests;
logging the access requests at the PART node in a random access, multithreaded log;
forwarding the access requests from the PART node to the primary node and restore node;
logging the access requests received at the primary node within a first single threaded sequential log;
logging the access requests received at the restore node within a second single threaded sequential log, wherein the logging of the access requests received at the primary node and the logging of the access requests at the restore node occur independently of the logging of access requests at the PART node;
storing data associated with the access requests in a primary cache at the primary node;
storing data associated with the access requests in a restore cache at the restore node;
determining when a number of access requests in the random access, multithreaded log in the PART node reaches a predetermined number;
issuing a synchronization command from the PART node to the primary and restore nodes;
at the primary node, flushing data from the primary cache to persistent storage associated with a first file system in the primary node;

in the restore node, flushing data from the restore cache to persistent storage associated with a second file system in the restore node; and after flushing data in the primary and restore nodes, releasing entries in the random access, multithreaded log in the PART node.

7. The method of claim 6, wherein the primary cache and the restore cache in the primary and restore nodes, respectively, comprise volatile random access memory and wherein the persistent storage associated with each of the primary and restore nodes comprises disk-based storage.

8. The method of claim 6, additionally comprising:
prior to flushing data to at least one of the first and second file systems,
determining a failure condition is occurring in at least one of the first and second file systems; and
replaying the random access, multithreaded log in an order determined by the transaction IDs to bring at least one of the first and second file systems to a known consistent state.

9. A data-intelligent storage system, comprising:
a primary node for storing primary data and in-line analytics,
a restore node for storing further analytics and intelligence;
a protection and analytics (PART) node, the PART node for:
receiving access requests from multiple concurrently executing threads within the PART node;
assigning a transaction identifier (ID) to each of the access requests;
logging the access requests in a random access, multithreaded log; and
forwarding the access requests from the PART node to both the primary node and restore node;
the primary node further for logging the access requests within a first single threaded sequential log;
the restore node further for logging the access requests within a second single threaded sequential log, wherein logging the access requests by the primary node and restore node occur independently of the logging of the access requests by the PART node;
the primary node further comprises a primary cache memory for storing data associated with the access requests;
the restore node further comprises a restore cache memory for storing data associated with the access requests;
the PART node additionally for:
determining when a number of access requests in the random access, multithreaded log reaches a predetermined number; and
issuing a synchronization command to the primary and restore nodes;
the primary node additionally for flushing data from the primary cache to persistent storage associated with a first file system in the primary node;
the restore node additionally for flushing data from the restore cache to persistent storage associated with a second file system in the restore node; and
the PART node further for after flushing data in the primary and restore nodes, releasing entries in the random access, multithreaded log.

10. The system of claim 9, wherein the PART node is additionally for gathering write data at a virtual file system layer.

11. The data-intelligent storage system of claim 9, wherein the primary cache memory and the restore cache memory in the primary and restore nodes, respectively, comprise volatile random access memory and wherein the persistent storage associated with each of the first and second file systems comprises disk-based storage.

12. The data-intelligent storage system of claim 9, wherein the PART node is additionally for:
prior to flushing data to at least one of the first and second file systems,
determining a failure condition is occurring in at least one of the first and second file systems; and
replaying the random access, multithreaded log in an order determined by the transaction IDs to bring at least one of the first and second file systems to a known consistent state.

\* \* \* \* \*